(12) United States Patent
Bhunia et al.

(10) Patent No.: US 12,470,221 B2
(45) Date of Patent: Nov. 11, 2025

(54) PROGRAMMABLE APPLICATION-SPECIFIC ARRAY FOR PROTECTING CONFIDENTIALITY AND INTEGRITY OF HARDWARE IPS

(71) Applicants: University of Florida Research Foundation, Incorporated, Gainesville, FL (US); Intel Corporation, Santa Clara, CA (US)

(72) Inventors: Swarup Bhunia, Gainesville, FL (US); Aritra Dasgupta, Gainesville, FL (US); Pravin Gaikwad, Gainesville, FL (US); Md Moshiur Rahman, Gainesville, FL (US); Aritra Bhattacharyay, Gainesville, FL (US); Nij Dorairaj, Santa Clara, CA (US); David Kehlet, Santa Clara, CA (US)

(73) Assignees: University of Florida Research Foundation, Incorporated, Gainesville, FL (US); Intel Corporation, Santa Clara, CA (US)

( * ) Notice: Subject to any disclaimer, the term of this patent is extended or adjusted under 35 U.S.C. 154(b) by 725 days.

(21) Appl. No.: 17/808,179

(22) Filed: Jun. 22, 2022

(65) Prior Publication Data

US 2023/0006674 A1 Jan. 5, 2023

Related U.S. Application Data

(60) Provisional application No. 63/216,971, filed on Jun. 30, 2021.

(51) Int. Cl.
| | |
|---|---|
| *G06F 9/30* | (2018.01) |
| *G06F 9/448* | (2018.01) |
| *H03K 19/17728* | (2020.01) |
| *H03K 19/21* | (2006.01) |

(52) U.S. Cl.
CPC ... *H03K 19/17728* (2013.01); *G06F 9/30134* (2013.01); *G06F 9/4498* (2018.02); *H03K 19/21* (2013.01)

(58) Field of Classification Search
USPC .......................... 716/101, 102, 103, 104, 106
See application file for complete search history.

(56) References Cited

U.S. PATENT DOCUMENTS

| | | | |
|---|---|---|---|
| 2005/0156626 A1* | 7/2005 | Tomar | ..................... G06F 30/34 326/38 |
| 2020/0387654 A1* | 12/2020 | Kimura | ................. G06F 30/327 |

* cited by examiner

*Primary Examiner* — Brian Ngo
(74) *Attorney, Agent, or Firm* — Alston & Bird LLP

(57) ABSTRACT

A method and system are directed to protecting hardware IP, particularly of ASIC designs. Programmability is introduced into an ASIC design to increase the difficulty of formulating ASIC designs as Boolean Satisfiability (SAT) problems. Fine-grain redaction of security-critical information from a design is employed by removing high-entropy logic blocks and subsequently inserting programmable components in place of the redacted portion to hide the actual design intent.

19 Claims, 35 Drawing Sheets

PROGRAMMABLE APPLICATION-SPECIFIC ARRAY FOR PROTECTING CONFIDENTIALITY AND INTEGRITY OF HARDWARE IPS

CROSS REFERENCE TO RELATED APPLICATION

This application claims the priority of U.S. Provisional Application No. 63/216,971, entitled "PROGRAMMABLE APPLICATION-SPECIFIC ARRAY FOR PROTECTING CONFIDENTIALITY AND INTEGRITY OF HARDWARE IPS," filed on Jun. 30, 2021, the disclosure of which is hereby incorporated by reference in its entirety.

GOVERNMENT SUPPORT

This Invention was made with Government support under Agreement No. N00164-19-9-0001, awarded by NSWC Crane Division. The Government has certain rights in the Invention.

TECHNICAL FIELD

The present application relates to integrated circuits, and more particularly to transforming an integrated circuit to thwart functional and structural attacks on its confidentiality or integrity.

BACKGROUND

The ever-rising demand for integrated circuits (IC) and the globalization of the manufacturing supply chain have led to the outsourcing of critical steps of the semiconductor design process to untrusted facilities abroad. Hardware intellectual property (IP) blocks have been subjected to various forms of confidentiality and integrity attacks in recent years. As a result, it has become vital for designers to assume a Zero Trust model for security, where there are no trusted entities involved anywhere during the life cycle of hardware IP. System on chip (SoC) designers are now considering a Zero Trust model for security, where an IP can be attacked at any stage of the manufacturing process.

In a Zero Trust model, as shown in FIG. 1, it is imperative to protect the IPs against reverse engineering, piracy, cloning, counterfeiting, over-production as well as malicious alternations, such as an injection of malicious hardware like hardware Trojans to steal sensitive information or corrupt the functionality. To combat these issues, logic locking and hardware obfuscation techniques have appeared promising to protect IP against these attacks and has been an active research topic over the past decade. However, in parallel, the number of functional and structural attacks on obfuscation have been discovered by the research community to break the protection provided by the existing obfuscation schemes. Field-programmable gate arrays (FPGAs) may also provide a high level of security against these attacks, however, recent studies have shown that FPGAs are vulnerable to a variety of side-channel and reverse engineering attacks. Furthermore, FPGAs often incur significant overhead in power and performance compared to its application-specific integrated circuit (ASIC) counterpart. Existing countermeasures also lack the ability to defend against state-of-the-art machine learning based confidentiality attacks where the adversaries take advantage of apriori knowledge of the designs as well as malicious modifications to the design hardware Trojans, which can lead to information leaking or tampering and damage to the integrity of the design.

There is a need for a robust architecture for programmable replacement of logic blocks to thwart knowledge-based attacks.

BRIEF SUMMARY

Various embodiments described herein relate to methods, apparatuses, and systems for protecting hardware IP, particularly of ASIC designs. The disclosed embodiments may employ fine-grain redaction of security-critical information from a design by removing high-entropy logic blocks and subsequently inserting programmable components in place of the redacted portion. In some embodiments to hide the actual design intent. Such an approach may be effective in providing FPGA-like IP security, while incurring a fraction of cost compared to FPGAs in terms of area/performance/power overhead.

According to one embodiment, the method comprises receiving a file including data comprising a hardware netlist, converting the data into a hypergraph, the hypergraph including nodes representative of logic gates and edges representative of connections of the logic gates, replacing given ones of the nodes in the hypergraph with configurable lookup tables (LUTs), inserting one or more first programmable components into the hypergraph based on the configurable LUTs, and generating a redacted design output file based on the hypergraph including the configurable LUTs and the one or more first programmable components.

In some embodiments, the data is representative of hardware intellectual property comprising application-specific integrated circuit components. In some embodiments, the hypergraph comprises a directed acyclic graph consisting of AND, OR, and inverter gates. In some embodiments, security critical nodes are identified based on cost of removal. In some embodiments, for each node of the hypergraph, a cost function is calculated using stochastic properties including Shannon entropy E, fan-in cone FI, and fan-out cone FO. In some embodiments, the method further comprises determining, for the security critical nodes, a maximum fan-out free cone (MFFC), obtaining local optimal cuts by analyzing the MFFC based on area and delay, and selecting globally optimal cuts from the local optimal cuts based on normalized area and delay cost of the local optimal cuts based on a pre-defined security target. In some embodiments, the globally optimal cuts are mapped to the configurable LUTs according to size, and the configurable LUTs are chained based on order of a proximity metric calculated from relative distance of the logic gates corresponding to the replaced given ones of the nodes.

In some embodiments, inserting the one or more first programmable components into the hypergraph further comprises inserting a programmable interconnect at an output of a given one of the configurable LUTs. In some embodiments, one or more second programmable components are connected to inputs of the programmable interconnect at a same logic depth as the given configurable LUT. In some embodiments, the one or more second programmable components comprise at least one of programmable flip-flops (FFs) and programmable clock gating. In some embodiments, the programmable interconnect comprises at least one of XOR/XNOR gates and multiplexers (MUXes). In some embodiments, the method further comprises identifying logic cones from the hypergraph that store critical information, and mapping the logic cones a M×N configurable LUT using Shannon Decomposition Theorem or Boole's Expansion Theorem.

In some embodiments, a configuration bitstream is generated for the configurable LUTs by simulating logic corresponding to the replaced nodes. In some embodiments, the configurable LUTs are programmed using the configuration bitstream. In some embodiments, the configuration bitstreams are stored in one or more shift registers of varying sizes. In some embodiments, each of the one or more shift registers includes a plurality of latches each of which includes an enable pin. In some embodiments, the configuration bitstream may be loaded to a daisy-chained shift register comprising a latch-based configuration including a plurality of latches and a finite-state machine-based controller, where the finite-state machine-based controller generates enable signals for the plurality of latches. In some embodiments, bits of the configuration bitstream may be shared between MUXes within a given configurable LUT or in between the configurable LUTs.

In some embodiments, nodes in the hypergraph corresponding to flip-flops in a shift register are replaced with scan-based FFs. In some embodiments, the scan-based FFs are controllable via a scan enable signal to select between configuration bit or design FF functionality. In some embodiments, the scan-based FFs are connected to select inputs of MUXes of a MUX array, and an output of a given one of the configurable LUTs is coupled to a field-programmable gate array-like block.

BRIEF DESCRIPTION OF THE DRAWINGS

Embodiments incorporating teachings of the present disclosure are shown and described with respect to the figures presented herein.

DETAILED DESCRIPTION

Figure 1:
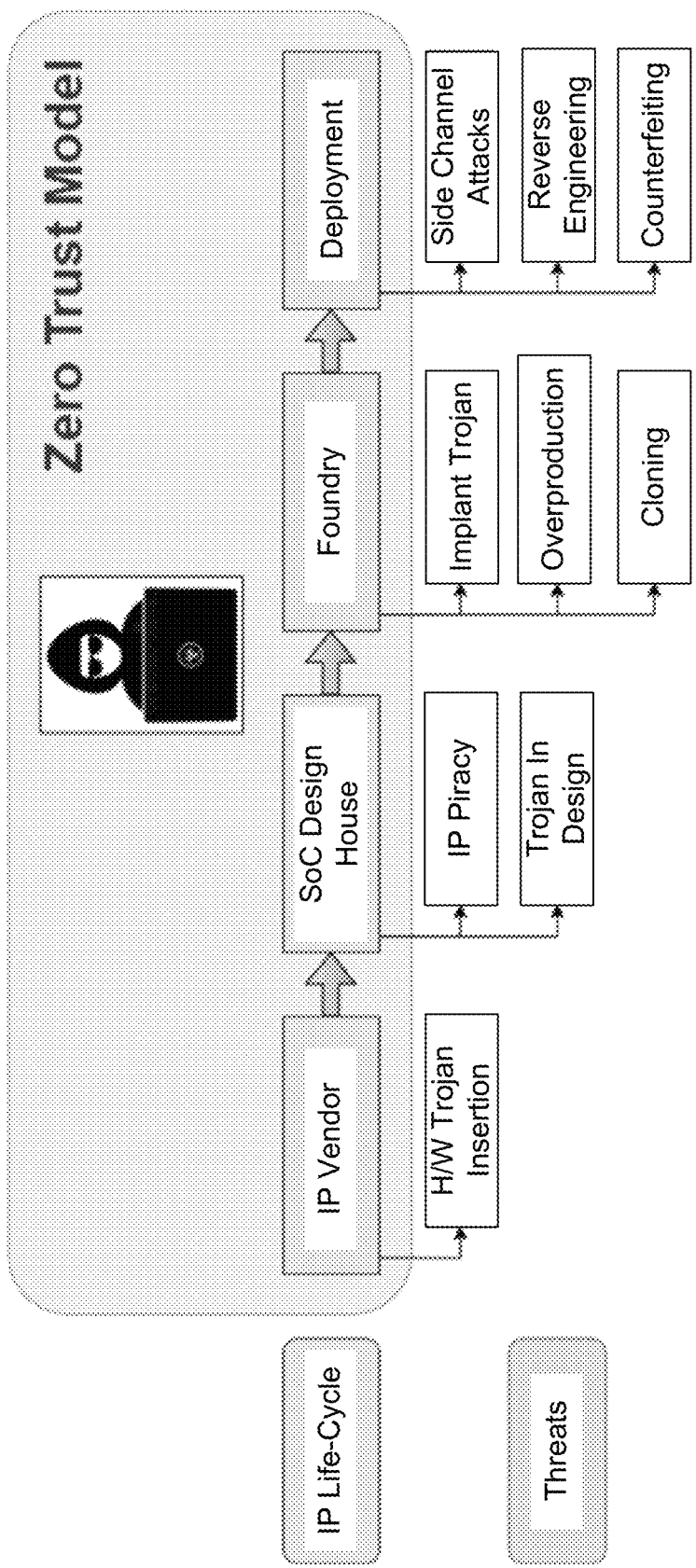
FIG. 1 illustrates a number of security issues spanning the life cycle of hardware intellectual property.

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

General Overview and Exemplary Technical Improvements

The present application discloses a programmable platform for safeguarding against different attacks on hardware IP confidentiality and integrity, particular in ASIC design. Hardware obfuscation techniques, both combinational and sequential can be used as countermeasures in ASIC design flow against certain types of attacks but are vulnerable against side-channel and reverse engineering attacks. Obfuscation techniques may also incur very high power, performance and area (PPA) overheads, which may lead to a comprise of security in real-life scenarios. Camouflaging the true design functionality can prevent reverse engineering attacks but is found to be vulnerable against both removal and Boolean Satisfiability (SAT)-based attacks.

Another technique may comprise a design fully configurable by using FPGAs. The programmability of FPGAs may allow designs to be suitable for security critical applications, but in recent years, FPGAs have been found to be vulnerable against bitstream decryption and reverse engineering attacks. Embedded FPGA fabrics can introduce programmability in ASIC, similar to FPGAs, but such countermeasures perform global redaction of the entire design logic, without any fine-grain control over the redaction process. This may not be suitable for large SoC designs where logic redaction is only desired for certain logic blocks that are critical in terms of security.

Multiple programmable replacement techniques have been proposed. Such techniques primarily focus on making the transformed design SAT-hard, i.e., by making it difficult for attackers to extract the unlocking key/bitstream. For example, cross-lock is an interconnect locking technique where the routing in a netlist is transformed using a one-time programmable interconnect mesh. This substantially increases the run time of each iteration of a SAT attack, making the transformed netlist SAT-hard. Programmable interconnects in cross-lock may be implemented using cross-bar primitives. The objective is to insert minimal programmable structures contributing to zero or negligible substrate area overhead. However, as high-density cone-based selection strategies, such as k-cut and wire-cut, are used to decrease the possibility of using removal attack, cross-lock has a restriction in selecting the wires to insert the crossbar. However, the limited programmability of the transformed netlist makes it vulnerable to machine-learning and other knowledge-based structural attacks.

Another programmable replacement technique includes full-lock. For example, full-lock uses a set of small-sized fully programmable logic and routing (PLR) block networks to transform a design. The PLRs are SAT-hard instances which perform both interconnect reprogramming and replacement of logic surrounding those interconnects. Each PLR is fully programmable and consists of: (1) a key-configurable logarithmic-based network (CLN) for obfuscating the interconnects and (2) multiple Spin Transfer Torque (STT) based lookup tables (LUTs) of small sizes for replacing logic gates connected to these inter-connects. The threat model for full-lock considers oracle-based, removal, and algebraic attacks, but this protection comes at a relatively high hardware cost. Moreover, the transformed designs may be vulnerable to clustering-based structural attacks that perform graph or network matching attacks, as the PLRs inserted into the design tend to be clustered together in one region of the circuit.

Yet another programmable replacement technique includes embedded FPGA (eFPGA). Embedded FPGA may comprise a synthesizable 'soft' FPGA fabric for ASIC that is developed using a top-down design methodology. A unit tile in the eFPGA fabric, commonly referred to as configurable logic block (CLB), may be comprised of multiple 6-input LUTs and flip-flops (FFs), similar to CLBs in commercial FPGAs. A FPGA fabric generator may be used to implement both homogeneous fabrics (with only CLBs) and heterogeneous (including CLB, block random access memory (BRAM), digital signal processor (DSP) and other custom blocks) fabrics. An eFPGA may be fully programmable like commercial FPGAs, and have a similar threat model to FPGAs. However, eFPGAs are not optimized for application-specific designs, therefore, may incur a relatively high overhead cost.

According to various embodiments of the present disclosure, methods and systems are provided for removing IP and replacing Boolean logic functions in ASIC designs. In particular, some embodiments include processes and computing systems directed to employing fine-grain redaction of logic and inserting FPGA-like programmability into ASIC design. As an example, Boolean functions or combinational logic of an ASIC design may be redacted by removing and replacing them with programmable components that can be configured using a functionally equivalent bitstream to the replaced functions or logic. In some embodiments, a logic redaction heuristic may be executed on the ASIC design. The logic redaction heuristic may comprise a greedy logic replacement heuristic to optimally map Boolean functions in an ASIC design to custom designed configurable LUTs at minimal power, performance, and area (e.g., power-performance area) overhead.

Exemplary Technical Implementation of Various Embodiments

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described with reference to example operations, steps, processes, blocks, and/or the like. Thus, it should be understood that each operation, step, process, block, and/or the like may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

Figure 2:
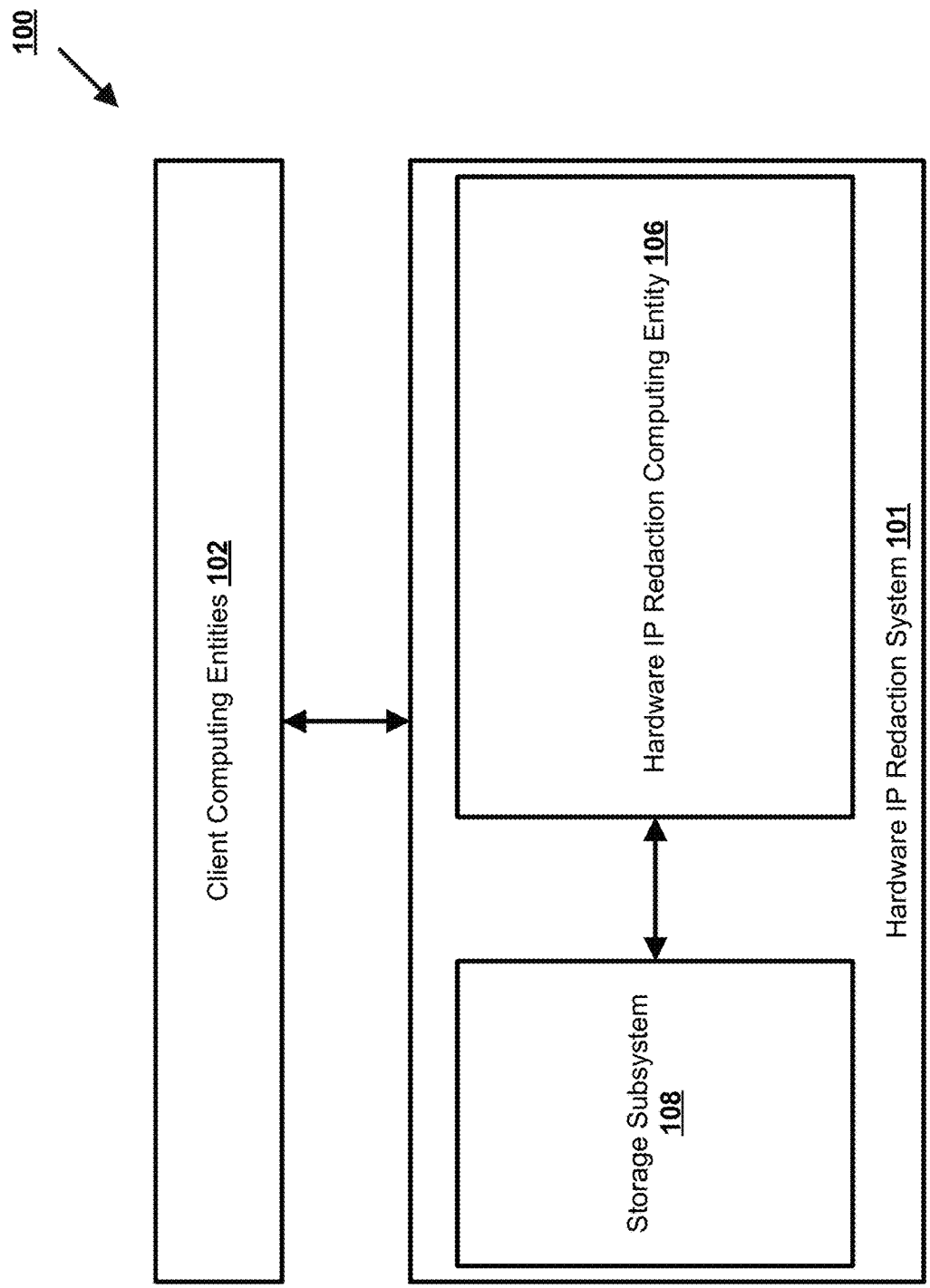
FIG. 2 illustrates an exemplary overview of an architecture that can be used to practice embodiments of the present disclosure.

FIG. 2 is a schematic diagram of an example architecture 100 for securing hardware IP. The architecture 100 includes a hardware IP redaction system 101 configured to receive hardware redaction requests from client computing entities 102, process the hardware redaction requests to generate hardware redactions, and provide the generated hardware redactions to the client computing entities 102.

For example, in accordance with various embodiments of the present invention, security-critical information may be redacted from a hardware design by removing high-entropy logic blocks and subsequently inserting programmable components in place of the redacted portion. Additionally, employing programmable interconnects provides structural deformation and hides the actual design intent. Such an approach is effective in providing FPGA-like IP security, while incurring a fraction of cost compared to FPGAs in terms of area/performance/power overhead. This technique will lead to more effective protection of hardware IP. In doing so, the techniques described herein improving efficiency and speed of securing hardware IP, thus reducing the number of computational operations needed. Accordingly, the techniques described herein improve at least one of the computational efficiency, storage-wise efficiency, and speed of performing hardware redaction.

In some embodiments, hardware IP redaction system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The hardware IP redaction system 101 may include a hardware IP redaction computing entity 106 and a storage subsystem 108. The hardware IP redaction computing entity 106 may be configured to receive hardware redaction requests from one or more client computing entities 102, process the hardware redaction requests to generate hardware redactions corresponding to the hardware redaction requests, and provide the generated hardware redactions to the client computing entities 102.

The storage subsystem 108 may be configured to store input data used by the hardware IP redaction computing entity 106 to perform hardware IP redaction. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Hardware IP Redaction Computing Entity

Figure 3:
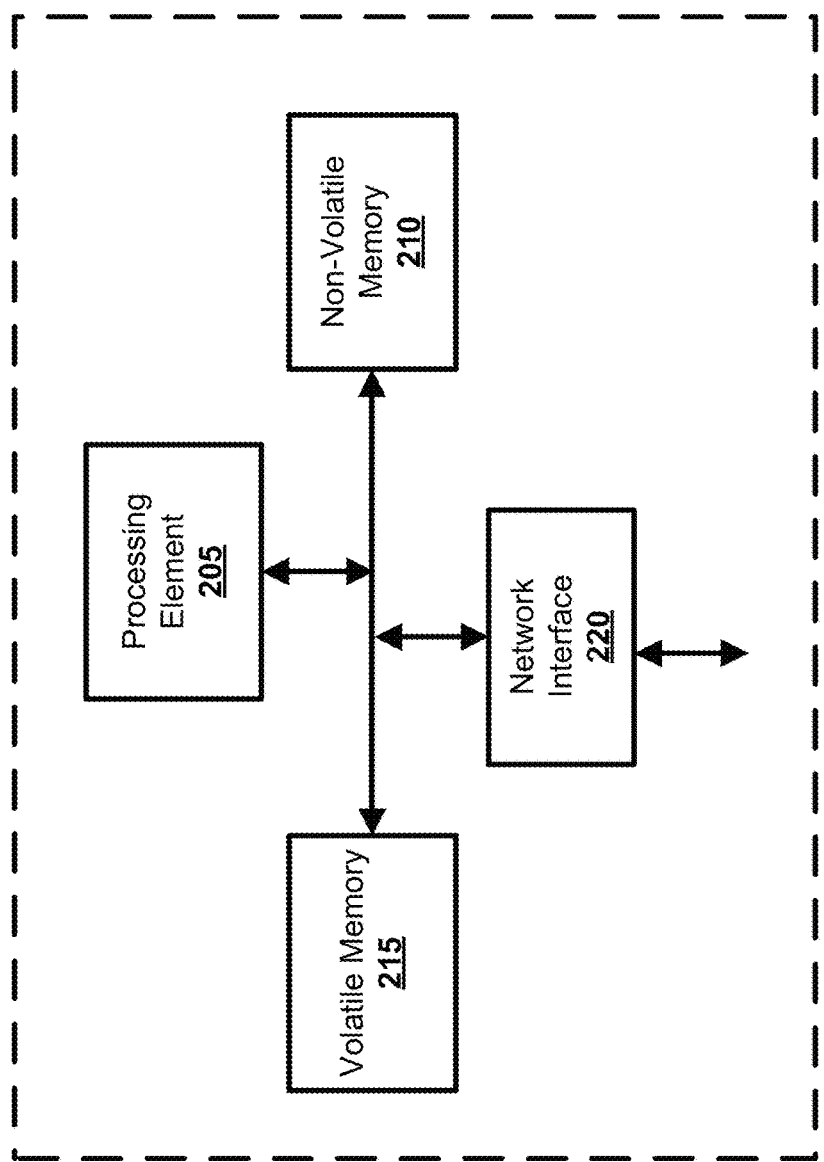
FIG. 3 illustrates an example hardware IP redaction computing entity in accordance with some embodiments discussed herein.

FIG. 3 provides a schematic of a hardware IP redaction computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the hardware IP redaction computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 3, in one embodiment, the hardware IP redaction computing entity 106 may include, or be in communication with, one or more processing elements 205 (also referred to as processors, processing circuitry, and/or similar terms used herein interchangeably) that communicate with other elements within the hardware IP redaction computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the hardware IP redaction computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the hardware IP redaction computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the hardware IP redaction computing entity 106 with the assistance of the processing element 205 and operating system.

As indicated, in one embodiment, the hardware IP redaction computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the hardware IP redaction computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the hardware IP redaction computing entity 106 may include, or be in communication with, one or more input elements, such as a keyboard input, a mouse input, a touch screen/display input, motion input, movement input, audio input, pointing device input, joystick input, keypad input, and/or the like. The hardware IP redaction computing entity 106 may also include, or be in communication with, one or more output elements (not shown), such as audio output, video output, screen/display output, motion output, movement output, and/or the like.

Exemplary Client Computing Entity

Figure 4:
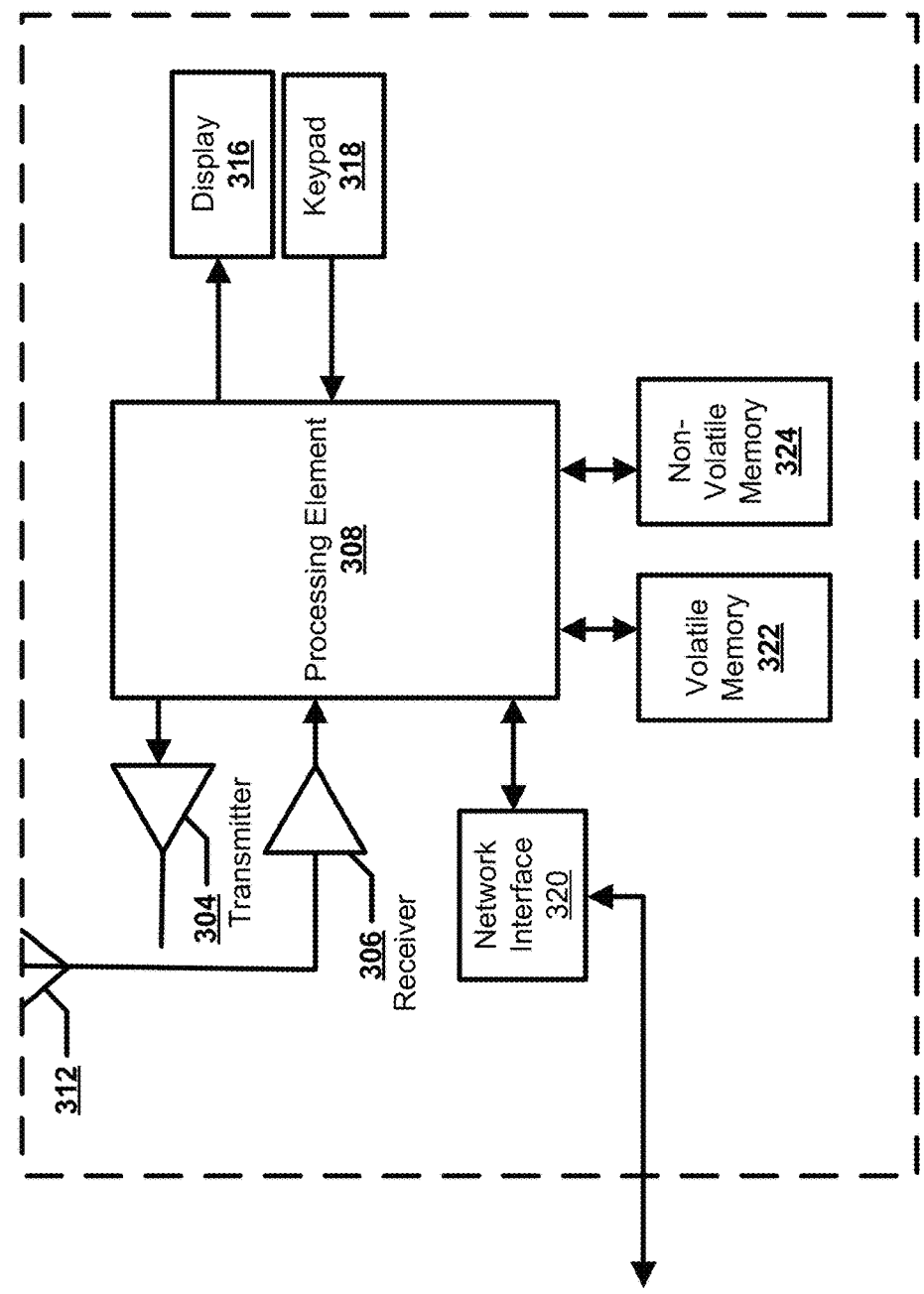
FIG. 4 illustrates an example client computing entity in accordance with some embodiments discussed herein.

FIG. 4 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 4, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the hardware IP redaction computing entity 106. In a particular embodiment, the client computing entity 102 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the hardware IP redaction computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the hardware IP redaction computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the hardware IP redaction computing entity 106 and/or various other computing entities.

In another embodiment, the client computing entity 102 may include one or more components or functionality that are the same or similar to those of the hardware IP redaction computing entity 106, as described in greater detail above. As will be recognized, these architectures and descriptions are provided for exemplary purposes only and are not limiting to the various embodiments.

Exemplary System Operations

Various embodiments of the present disclosure describe steps, operations, processes, methods, functions, and/or the like for securing hardware IP. In some embodiments, programmability is introduced into an ASIC design to increase the difficulty of formulating the ASIC design as a Boolean Satisfiability (SAT) problem and causes any kind of oracle-based functional attack on the design to be much more complex. Generating a SAT-hard design may comprise transforming an original ASIC design by replacing logic blocks in the original ASIC design with configurable LUTs and inserting programmable components. Examples of programmable components include programmable interconnects, programmable flip-flops, and programmable clock gating.

Figure 5:
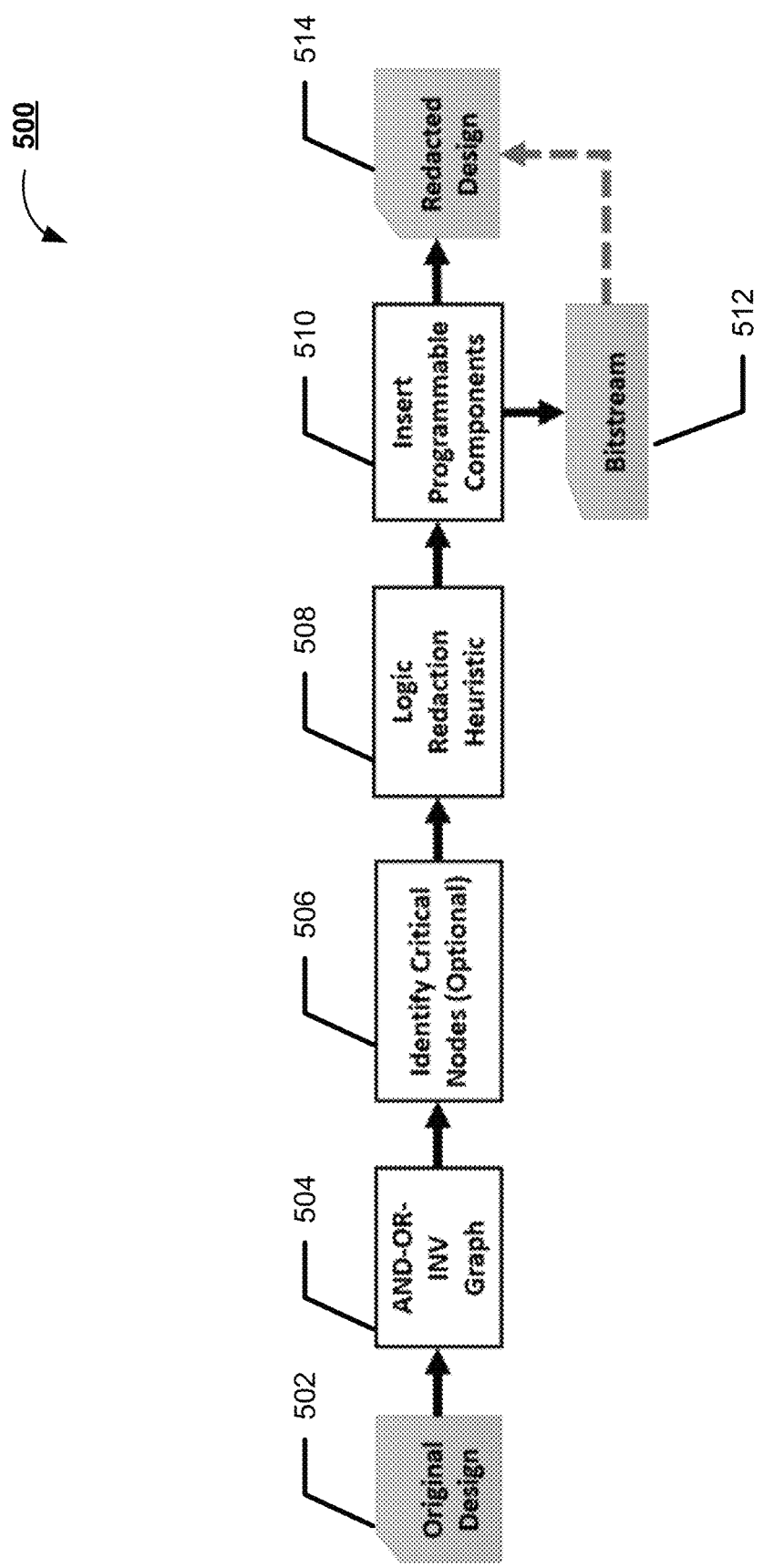
FIG. 5 illustrates a flowchart of a method for redacting hardware IP in accordance with some embodiments discussed herein.

FIG. 5 presents a flowchart of a process for redacting an ASIC design according to some embodiments of the present disclosure. The process 500 includes example operations that may be performed by the apparatus 200, and the apparatus 200 comprises means, such as processing element 205, memories 210 and 215, network interface 220, and/or the like, for performing the example operations.

At step 502, a file including data representative of hardware IP comprising an original design of a circuit is received. The original design may comprise a hardware netlist representative of, for example, a circuit or circuitry components. In particular, the original design may be associated with ASIC components according to various embodiments of the present disclosure. The hardware netlist may be represented by a hypergraph data structure.

Figure 6A:
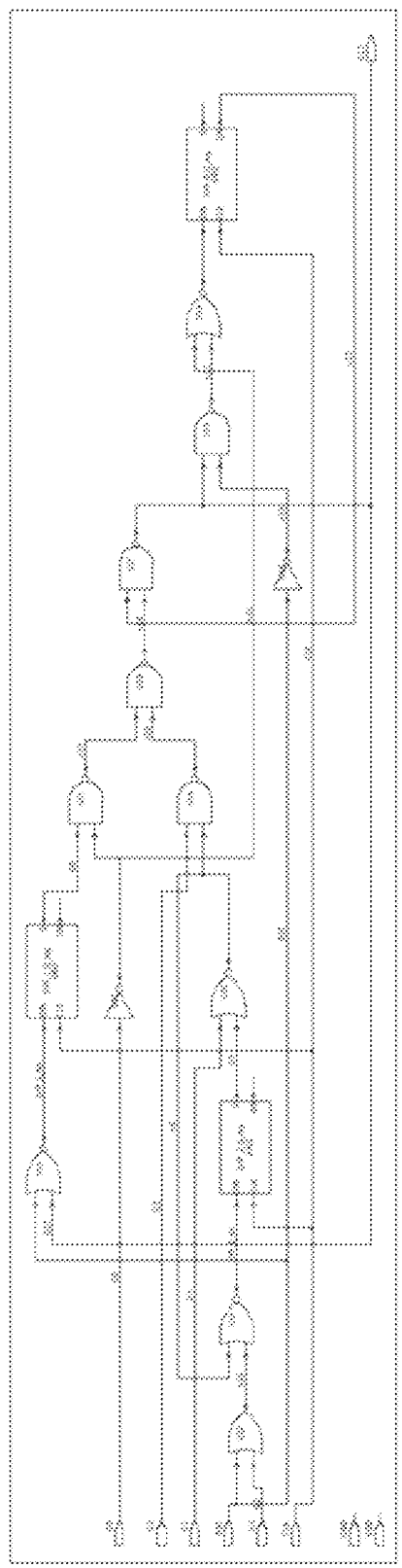
FIG. 6A illustrates a schematic block diagram of an exemplary circuit.
Figure 6B:
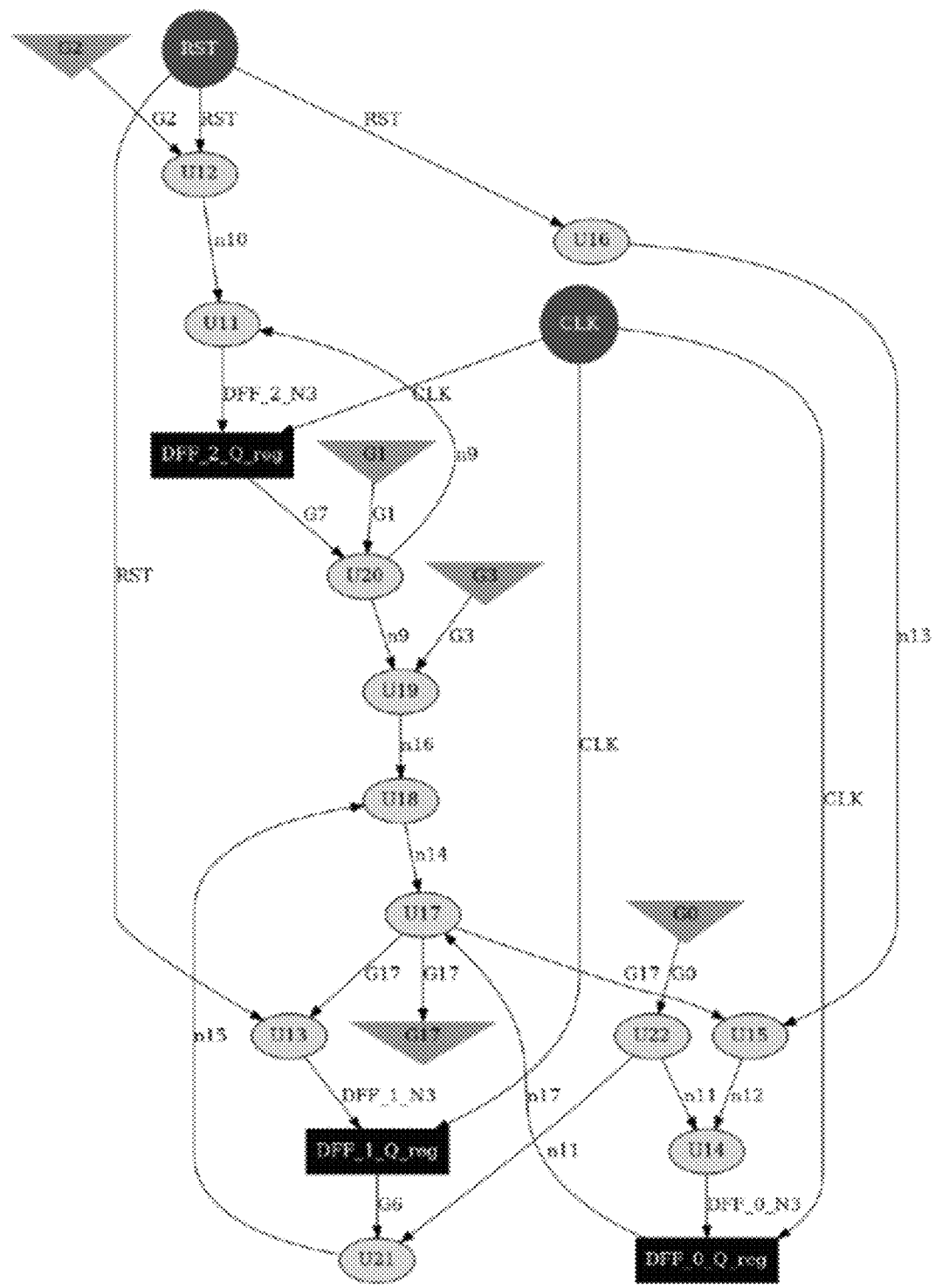
FIG. 6B illustrates a hypergraph associated with the circuit of FIG. 2A.

For example, referring to FIG. 6A, a sequential circuit is shown. The sequential circuit may be represented by a hypergraph as depicted in FIG. 6B according to some embodiments of the present disclosure. A hypergraph data structure may comprise a generalized graph including edges that can connect two or more nodes. Hypergraphs can be used to generate a graphical representation of a hardware netlist. A hypergraph may include nodes that represent logic gates (combinational or sequential) and edges that represent nets connected to such gates. The hypergraph structure can be used to store any information about the design components and any graph-based algorithm can be applied on the hypergraphs for analysis.

Referring back to FIG. 5, at step 504, the data from the file is converted into a hypergraph. A hypergraph may be generated based on the original design comprising a Boolean network in the form of a directed acyclic graph (DAG). The DAG may be representative of a gate-level netlist of hardware IP associated with the original design. The gate-level netlist may comprise a list of logic gates of the circuit and their respective connections. In some embodiments, the logic gates from the netlist are translated into nodes, and their connections are converted into edges that connect the nodes.

According to various embodiments of the present disclosure, security critical nodes may be removed from the hypergraph and replaced with configurable LUTs, which results in a partially configurable ASIC design (as opposed to a fully programmable FPGA). To increase the amount of logic gates removed for each configurable LUT (LUT coverage) and reduce the overall area overheads, the DAG may be limited to basic logic gates. For example, the DAG is limited to AND, OR, and inverter (INV) gates that results in an AND-OR-INV graph (AOIG). In addition to the increased LUT coverage, the hypergraph network may permit the use of standard graph algorithms for analyzing the original design's characteristics.

At step 506, security critical nodes of the hypergraph are identified. Identifying security critical nodes of the hypergraph may comprise identifying candidate nodes in the hypergraph using a cost-based approach where a cost of removal is computed for each node of the hypergraph. A cost of removal can be assigned to the nodes based on a cost function $cost_R$, and a cumulative cost of nodes, e.g., within logic cones comprising a set of nodes, can be determined as the sum of the costs of its members. The cost function $cost_R$ can be calculated using stochastic properties, such as, Shannon entropy, E, and structural and/or functional parameters of the original design, such as fan-in cone FI and fan-out cone FO, as follows:

$$cost_R = f(E, FI, FO) \quad (1)$$

In other embodiments, parameters, such as switching activity or signal probability skew at gate output and size of logic cones may also be used to compute the cost of removal. Nodes in the hypergraph that have high $cost_R$ values (e.g., exceeding a predetermined threshold) may be identified as the security critical nodes. A cutoff $cost_R$ may also be set to, e.g., 30% of all nodes (which may be configured depending upon the amount of logic to be redacted). It is noted that according to some embodiments of the present disclosure, the step of identifying security critical nodes may be optional and omitted.

At step 508, nodes of the hypergraph are replaced with configurable LUTs based on a logic replacement heuristic. According to an exemplary embodiment, the logic replacement heuristic may generate a mapping to identify nodes of the hypergraph for redaction using configurable LUTs. In some embodiments, the logic redaction heuristic may be used to find an optimal LUT mapping solution $L_{opt}$. The logic redaction heuristic may evaluate the removal cost, costR, using Equation (1) for all the nodes in the hypergraph and identify the security critical nodes corresponding to sensitive logic gates in the original according to step 506. The number of security critical nodes to be removed may be configurable and can vary based on security or attack resistance requirements. In some embodiments, the logic replacement heuristic targets nodes associated with combinational Boolean functions in the hypergraph while nodes associated with sequential logic in the hypergraph may be unmodified.

In one embodiment, a maximum fan-out free cone (MFFC) is determined for each security critical node in the hypergraph through graph traversal. The determined MFFCs are recursively analyzed to obtain local optimal cuts for the security critical nodes, in terms of both area and delay, which can be mapped to a N×1 configurable LUT. The local optimal cuts are stored in a global_cut_array. The global_cut_array may then be iteratively traversed using a greedy heuristic to select a globally optimal cut from the local optimal cuts of all the security critical nodes in the hypergraph. Thresholds may be used to select the cuts. Thresholds may be determined from a normalized area and delay costs of each cut, and the thresholds may be incremented after every iteration, until a pre-defined security target is met. The selected globally optimal cuts may then be mapped to corresponding configurable LUTs of the same or suitable size to form an intermediate LUT mapping $L_{inter}$ for the hypergraph. A post-processing step may be performed after global cut selection to analyze, and if possible, improve upon, the intermediate mapping $L_{inter}$. The resulting LUT mapping solution $L_{opt}$ is optimal for a pre-defined security target or under overhead cost constraints. The mapped LUTs may be ranked in the order of a proximity metric, calculated from the relative distance of the logic gates replaced by configurable LUTs in the hypergraph. As such, configurable LUTs inserted into the hypergraph are chained to each other based on the ranking such that it does not violate any synthesis constraint.

Figure 7:
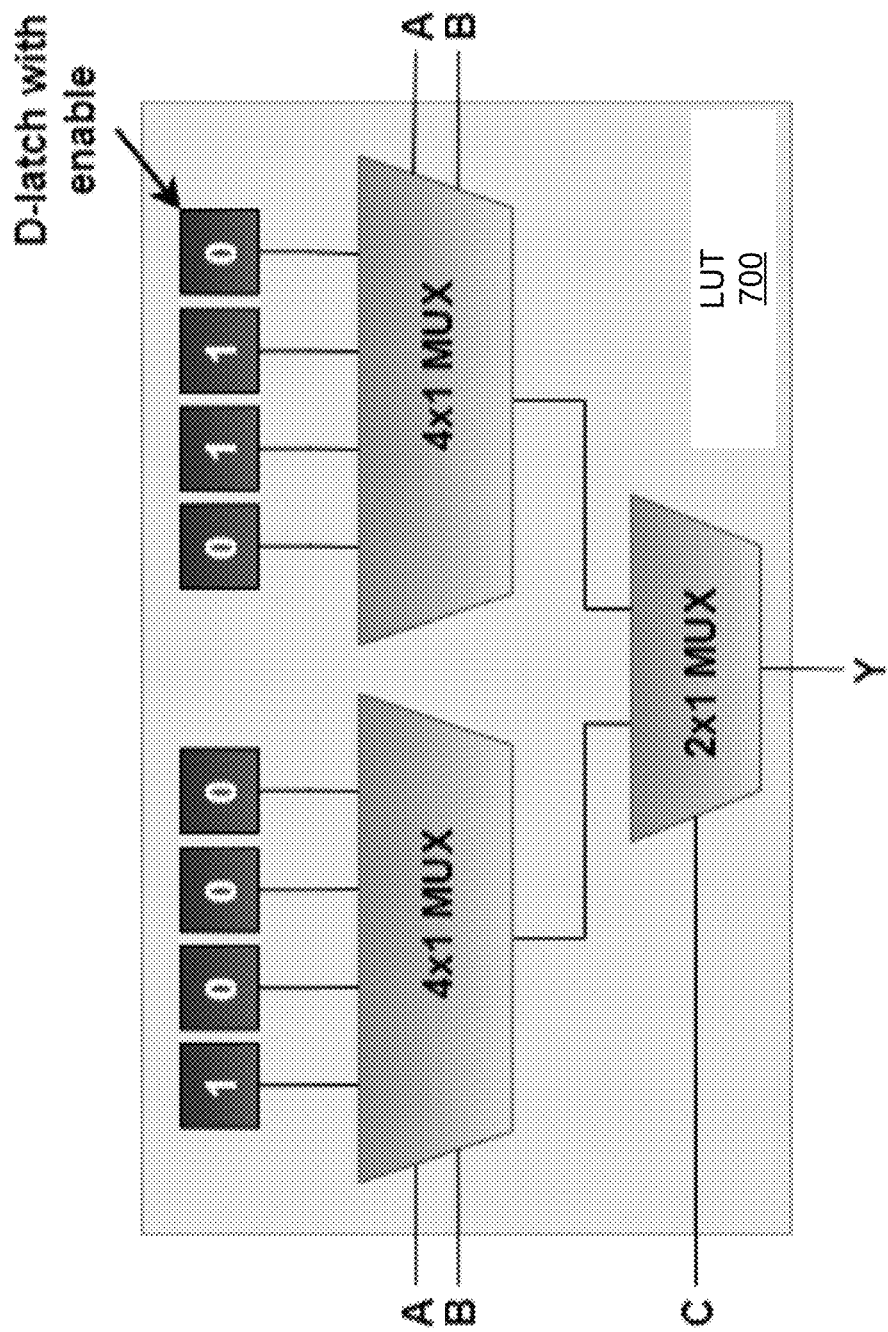
FIG. 7 illustrates a 3×1 lookup table (LUT) used to replace a logic function block, in accordance with one embodiment of the present disclosure.

In some embodiments, a configurable LUT 700 can be realized in ASIC using a customized LUT cell or existing standard cells. A standard cell-based implementation for a 3×1 configurable LUT, according to some embodiments of the present disclosure, is illustrated in FIG. 7, where an 8×1 MUX is designed using smaller MUXes available in any standard cell library. A configuration bitstream may be generated for the configurable LUTs. The configuration bitstream may comprise an array of constant bits that are stored in latches, flip-flops, or other memory/storage cells. The customization of the LUT cells enables optimum placement of standard cells, thereby reducing the removal and replacement overheads. The correct functionality of the replaced logic may be restored when the correct constant bits are loaded in the configuration latches. These constant bits can be shared with multiple configurable LUTs to minimize the overhead.

Referring back to FIG. 5, at step 510, one or more programmable components are inserted into the hypergraph based on the configurable LUTs. Programmable components may include, but are not limited to programmable interconnects, programmable flip-flops, and programmable clock gating. In some embodiments, a programmable interconnect may be placed at the output of a randomly selected LUT based on $L_{opt}$ determined from the logic redaction heuristic. Other programmable components (e.g., programmable flip-flops, and programmable clock gating) may also be connected to inputs of the programmable interconnect with edges in the hypergraph located at the same logic depth as the configurable LUT, to prevent combinational loops from forming. The SAT-attack resilience of the transformed design is improved by the insertion of programmable components into the hypergraph of the original design. Each programmable interconnect may comprise a SAT-proof block designed using, for example, XOR/XNOR gates and multiplexers (MUXes), as these logic gates have a high clause/variable ratio, which makes it difficult for the SAT solver to compute the distinguishing input pattern.

Figure 8:
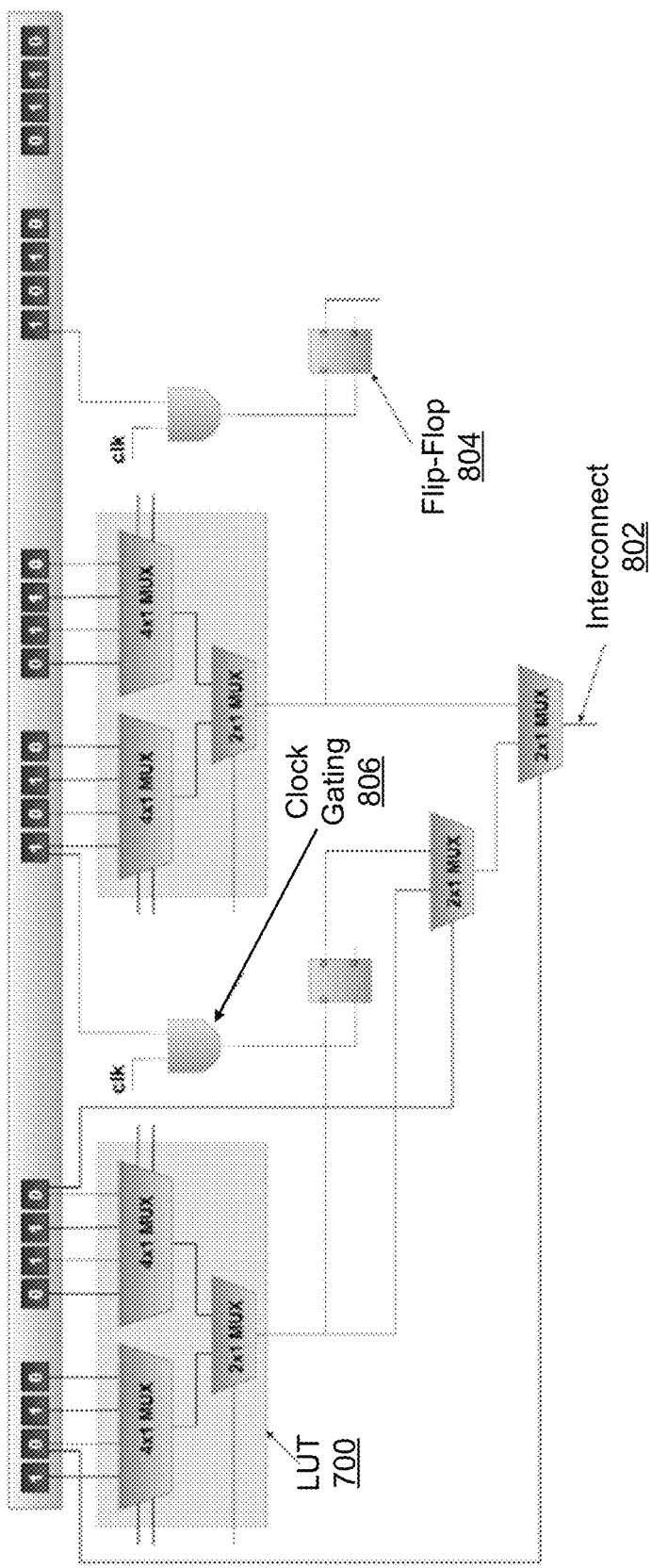
FIG. 8 illustrates exemplary programmable components used to replace one or more logic function blocks of a design, in accordance with some embodiments discussed herein.

Referring to FIG. 8, different types of programmable components are presented according to some embodiments of the present disclosure. Programmable components include, but are not limited to programmable interconnects 802, programmable flip-flops 804, and programmable clock gating 806.

In some embodiments, a programmable interconnect 802 can be implemented in ASIC as permutation boxes or switch boxes, crossbars, MUXes, demultiplexers (deMUXes), and XOR/XNOR gates. Such interconnects may be strategically placed in the data path of a transformed design to maximize security. The interconnects are properly routed when they are programmed with the correct configuration bits.

In some embodiments, programmable flip-flops 804 may comprise a control path in a sequential design including one or more finite-state machines (FSMs). The programmable flip-flops 804 in such FSMs can be made programmable to replace security critical parts of the state space in the design. Such programming alters the state transition function of a sequential design where the original state space can be reached only when the programmable flip-flops 804 are correctly programmed.

In some embodiments, programmable clock gating 806 may comprise a clock tree in a sequential design that is gated at suitable locations and made programmable. This ensures that the clock signal reaches other logic blocks at the correct level only if correct constant bit is used for clock gating.

Figure 9:
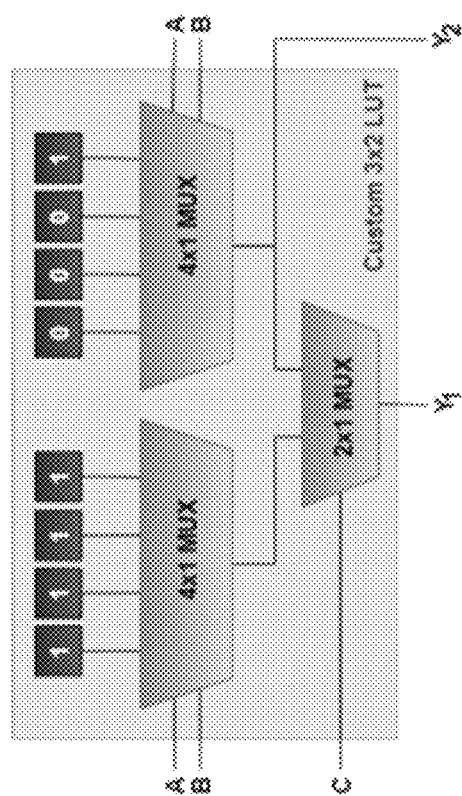
FIG. 9 illustrates mapping of a combinational logic to a 3×2 LUT using Shannon decomposition in accordance with some embodiments discussed herein.
Figure 9:
Figure 9:
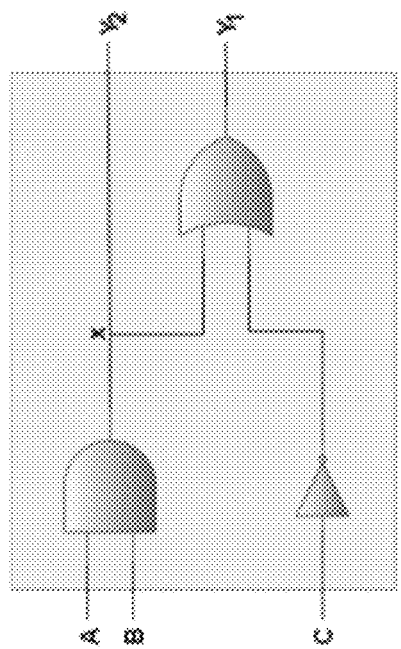

In an alternative embodiment, logic cones that store security critical information may be identified and mapped to a M×N configurable LUT of a suitable size, where both M and N can be any integer. As each configurable LUT may include an array of MUXes, LUT outputs can be taken from different MUX levels. This mapping can be realized for any Boolean logic using Shannon Decomposition Theorem, or Boole's Expansion Theorem, as illustrated in FIG. 9, according to some embodiments, for the following example:

$$Y1 = f(A,B,C) = (AB + \overline{C}) \quad (2)$$

$$Y2 = f(A,B) = AB \quad (3)$$

Using Shannon Decomposition it can be shown that, $Y1 = f(A,B,C) = \overline{C} \cdot f(A,B,0) + C \cdot f(A,B,1) = \overline{C}(AB) + C(1) = \overline{C}(Y2) + C(1)$.

Figure 10A:
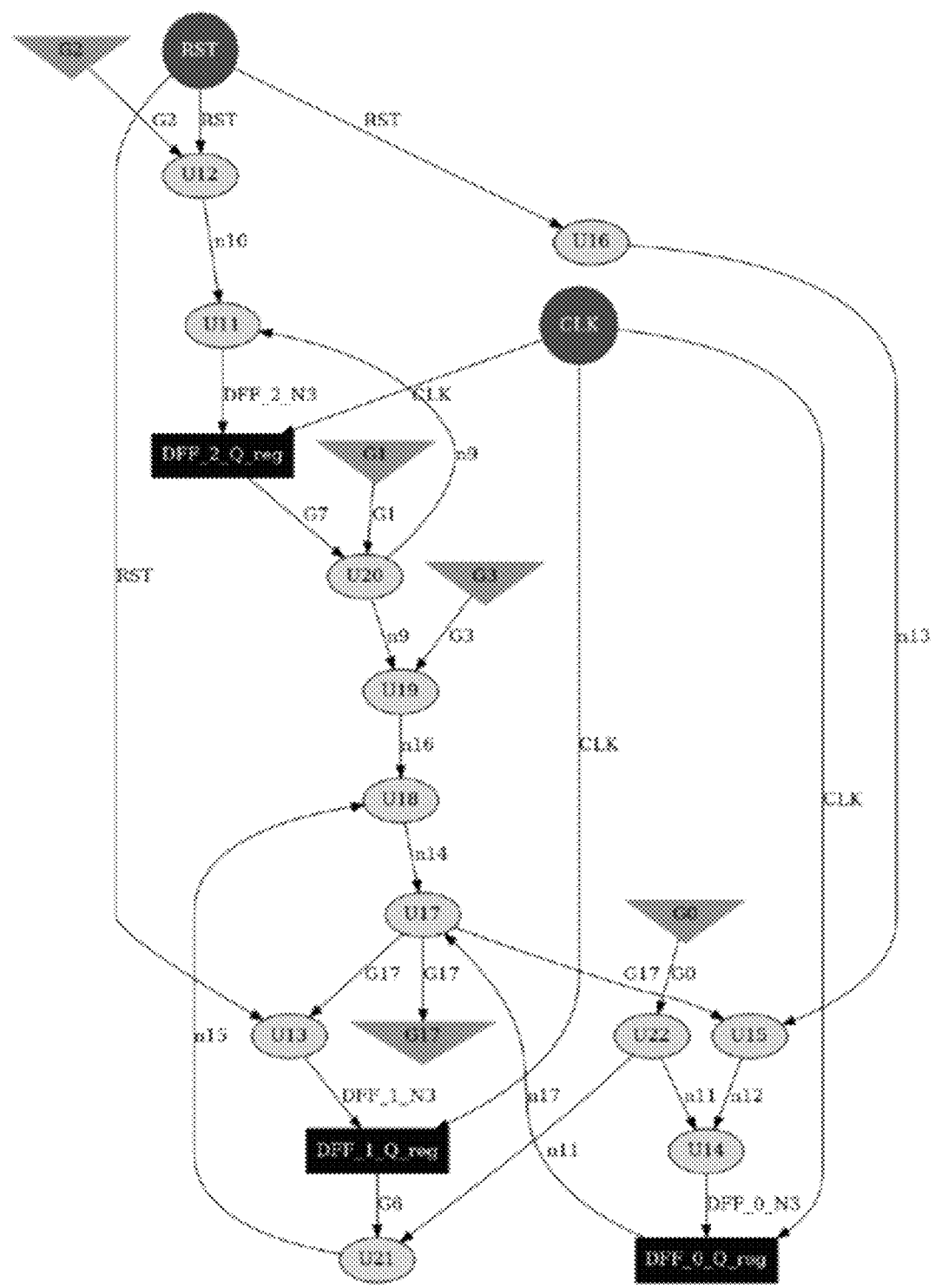
FIG. 10A illustrates a hypergraph associated with a design.
Figure 10B:
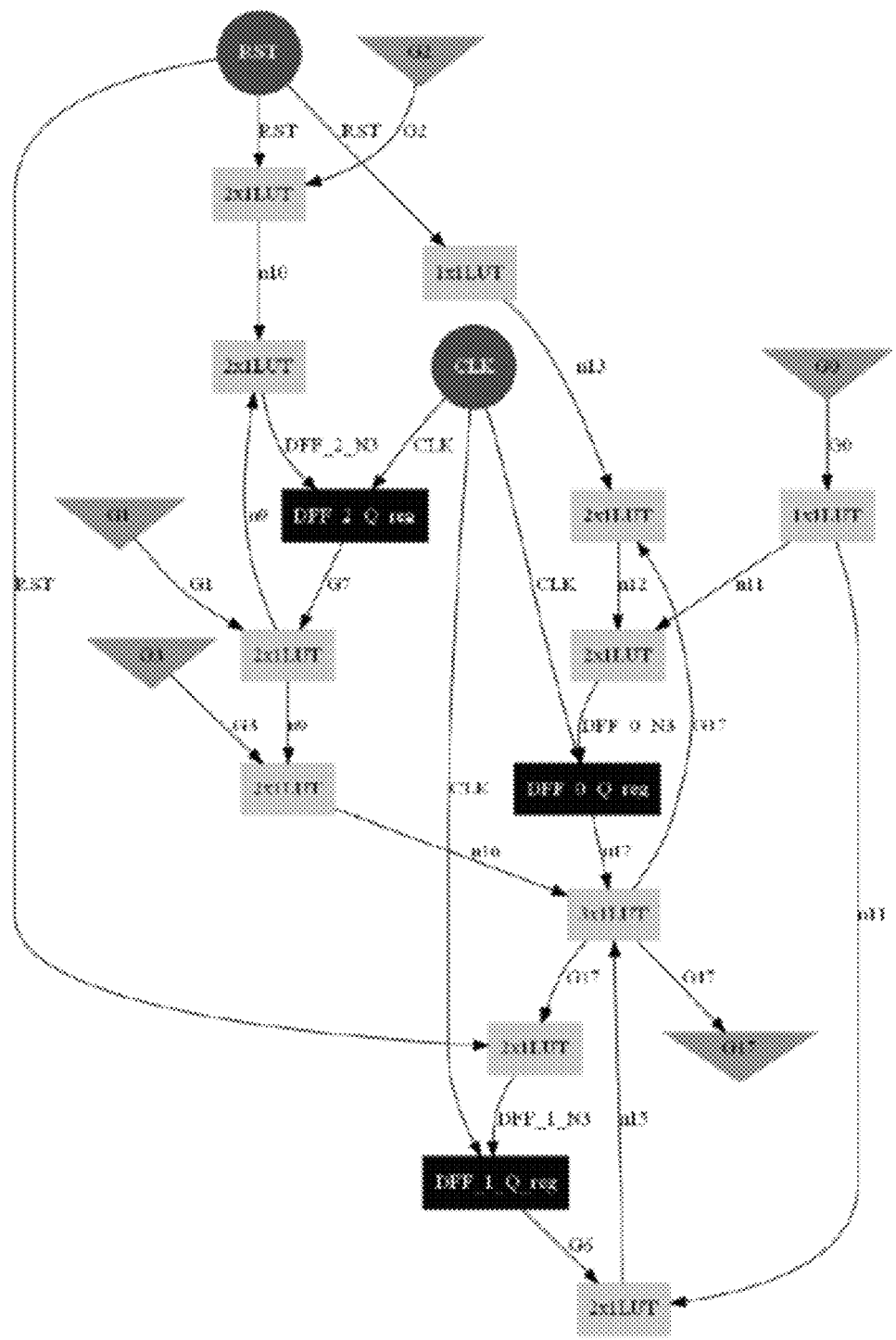
FIG. 10B illustrates a hypergraph associated with a transformed design of FIG. 10A in accordance with some embodiments discussed herein.

In yet another embodiment, in the absence of determining removal costs for nodes in the hypergraph, all logic (combinational and/or sequential) in a design can be replaced using a network of configurable LUTs, having random sizes, to maximize security. The resultant transformed design may be fully programmable, and analogous to an FPGA, but optimized for area, power, and delay. FIGS. 10A and 10B depict replacement of all combinational logic in an exemplary hypergraph with a LUT network according to some embodiments of the present disclosure. Any combinational or sequential design may be mapped to a fully programmable network of M×N LUTs.

Referring back to FIG. 5, at step 512, a configuration bitstream comprising configuration bits is generated for the configurable LUTs inserted into the hypergraph by simulating the replaced logic for each configurable LUT. The logic may be simultaneously simulated using a common testbench applying 2N input patterns, where N is the largest configurable LUT size in $L_{opt}$. The generated bitstream can be loaded or programmed to the inserted configurable LUTs, for example, during power-up of hardware corresponding to the original design, to bring the design in functional mode. An exemplary bitstream configuration architecture according to some embodiments of the present disclosure is presented in FIG. 11.

Referring back to FIG. 5, at step 514, a redacted design output file is generated based on the hypergraph including the one or more configurable LUTs and programmable components.

Figure 12:
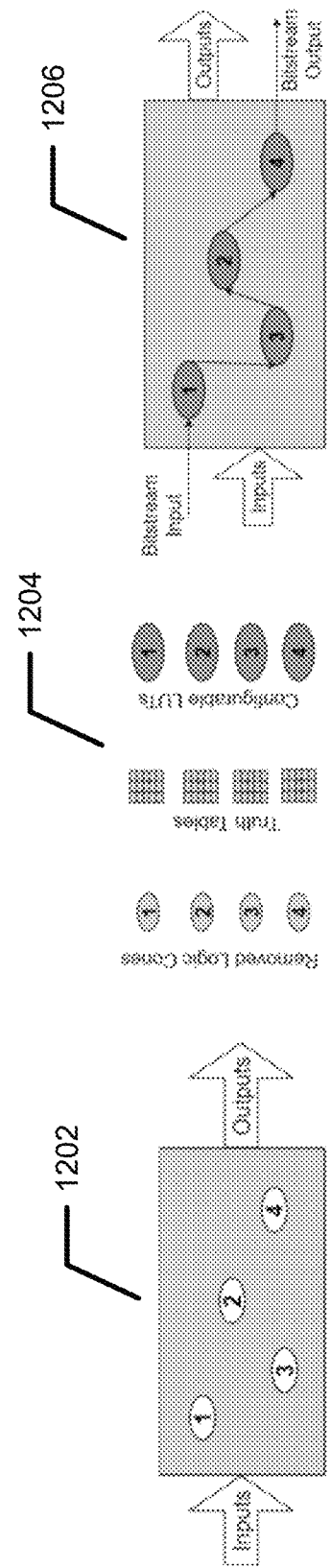
FIG. 12 illustrates a visualization of hardware design redaction in accordance with some embodiments discussed herein.

According to another embodiment, a method for redacting an ASIC design is visualized with reference to FIG. 12. An original design of hardware IP is received where security critical logic cones are identified (1202). Configurable LUTs are created for equivalent logic of the security critical cones to be removed (1204). The configurable LUTs are placed where logic is removed and connecting them in a chain for later configuration with a bitstream.

Figure 13A:
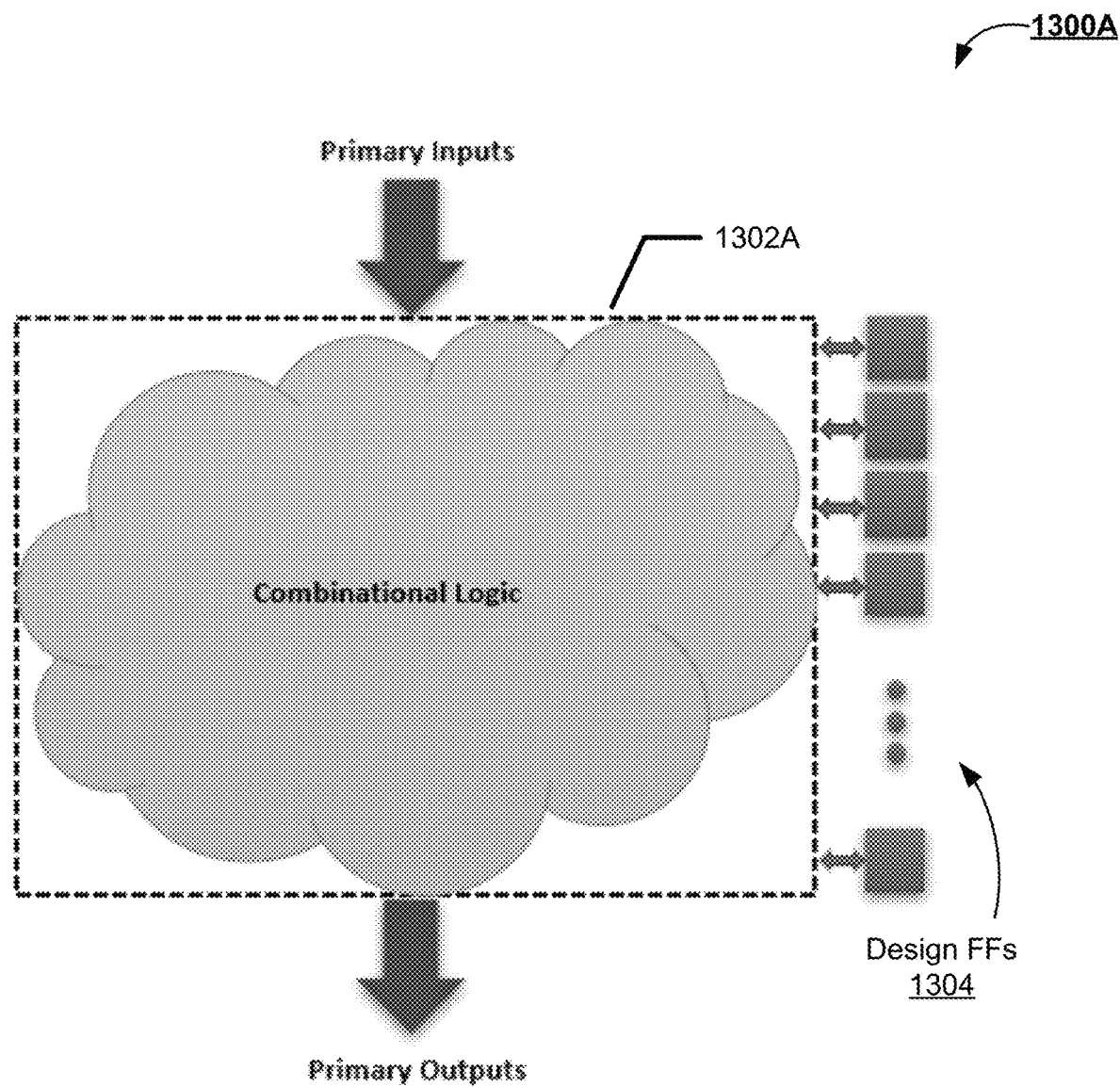
FIG. 13A illustrates an exemplary original design.
Figure 13B:
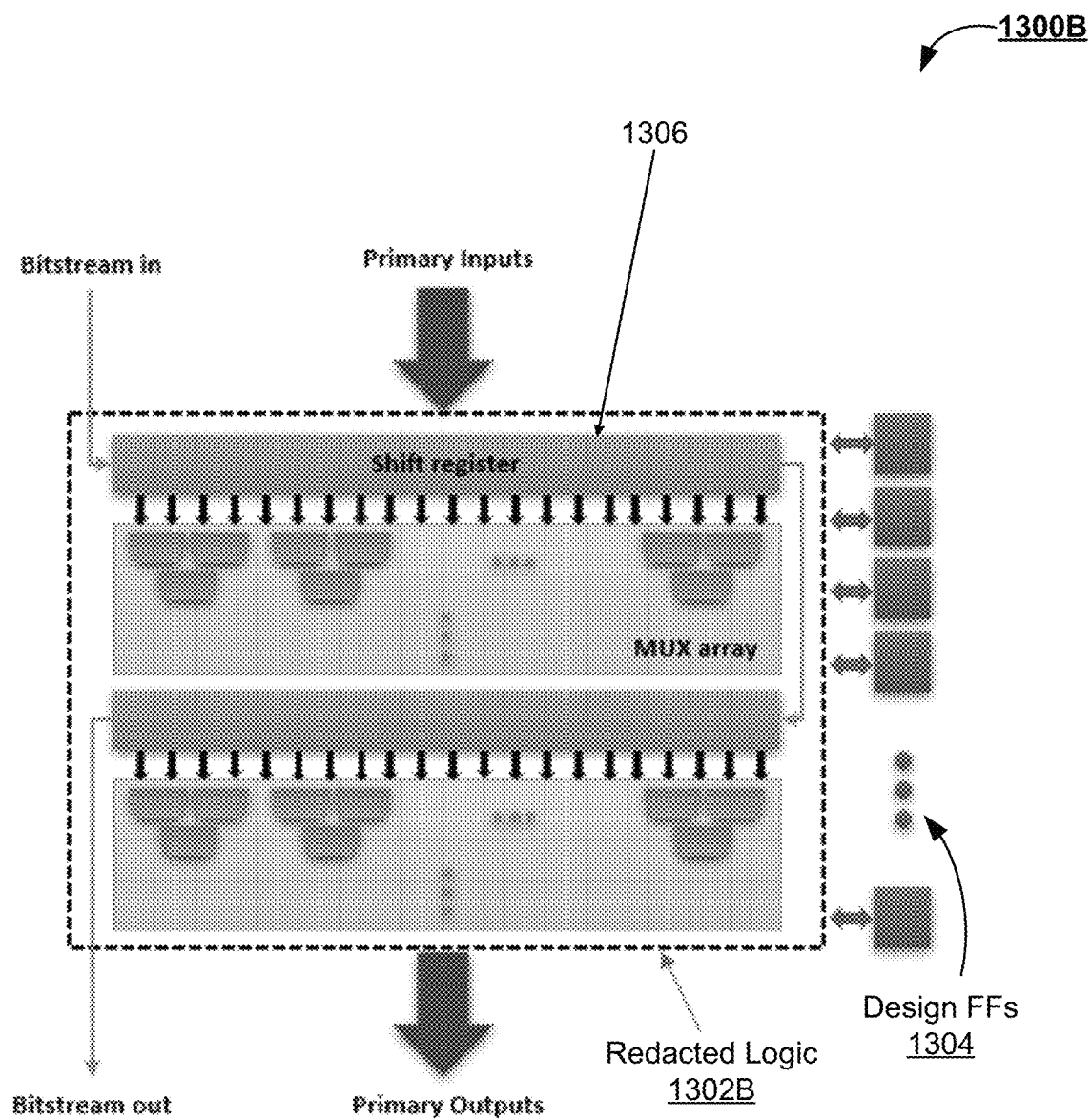
FIG. 13B illustrates an exemplary fully redacted design of FIG. 13A redaction in accordance with some embodiments discussed herein.

FIG. 13A presents an exemplary original design 1300A. The original design 1300A comprises a combinational logic space 1302 and design FFs 1304. In some embodiments, to maximize IP security, the entirety of combinational logic space 1302 may be redacted. FIG. 13B presents an exemplary fully redacted design 1300B according to some embodiments of the present disclosure. The fully redacted design comprises original design FFs 1304 (unmodified), and redacted logic 1302B including an array of configurable LUTs and programmable components. Such a design hides any structural information about the original design's intent. Configuration bitstream FFs may form a long shift register 1306 and remaining combinational logic may appear as a sea of MUXes realizing the LUTs and programmable components in the redacted design 1300B.

As discussed above, the logic replacement heuristic from step 508 may target combinational Boolean functions and not sequential logic. As such, original design FFs containing vital information about the original design intent and state space may be vulnerable to an attacker. To prevent this eventuality, in some embodiments, design FFs can be selectively removed and replaced with programmable FFs. Under full redaction, the entire sequential logic in the design can be replaced using this scheme, but with a significant increase in overhead. In order to realize programmable FFs, two approaches may be taken.

Figure 14:
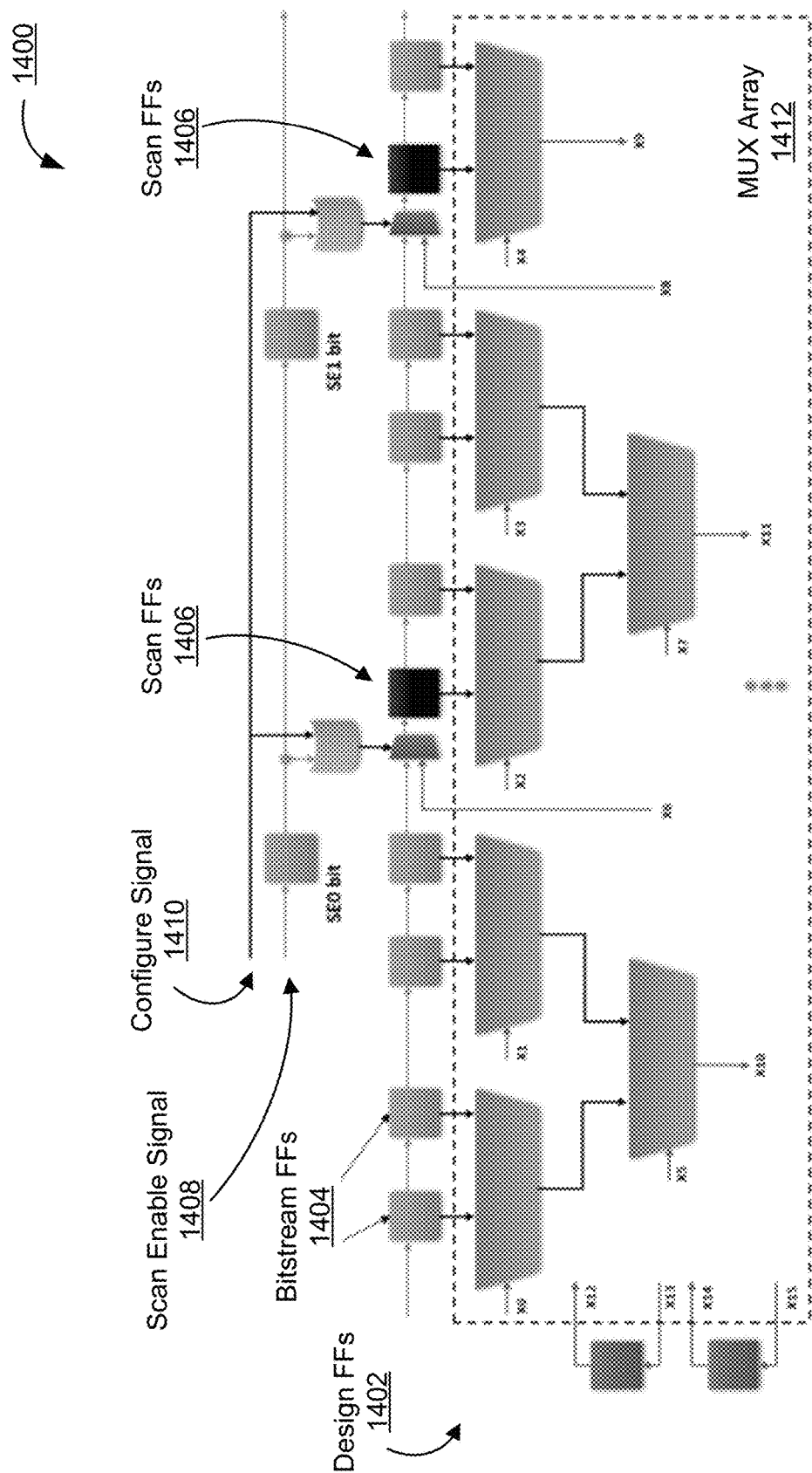
FIG. 14 illustrates an exemplary redacted design with scan FFs redaction in accordance with some embodiments discussed herein.

FIG. 14 presents an exemplary redacted design 1400 with programmable FFs according to an embodiment of the present disclosure. Design FFs 1402 and bitstream FFs 1404 may be selectively replaced with scan-based FFs 1406. Scan FFs 1406 may be strategically placed in the shift register used for configuration of the redacted design. A scan enable (SE) signal 1408 can be used to select whether the scan FFs 1406 function as a configuration bit or as a design FF 1402, hence making the scan FF 1406 programmable. The SE bit value can be stored in a separate shift register or can be part of the existing configuration register. A configure signal 1410 can be used to control programmable scan FFs 1406 and configure them to their correct value during operation. The configure signal 1410 may also be used to multiplex between the design clock signals and the configuration bitstream configuration clocks.

The design FFs 1402 programmed using this approach may be connected to the select inputs of MUXes of MUX array 1412 in the redacted design 1400, which can differentiate them from the configuration bitstream FFs 1404 in the shift register, which are connected to the data inputs of MUXes of MUX array 1412. To remove such structural signatures, the combinational logic gates at the output of design FFs 1402 can be realized using MUXes of MUX array 1412 and constants from other bitstream registers instead of custom LUTs. As a result, the design FFs 1402 in the redacted circuit may be connected to the data inputs of MUXes of MUX array 1412, making them identical to the configuration bitstream FFs 1404.

Figure 15A:
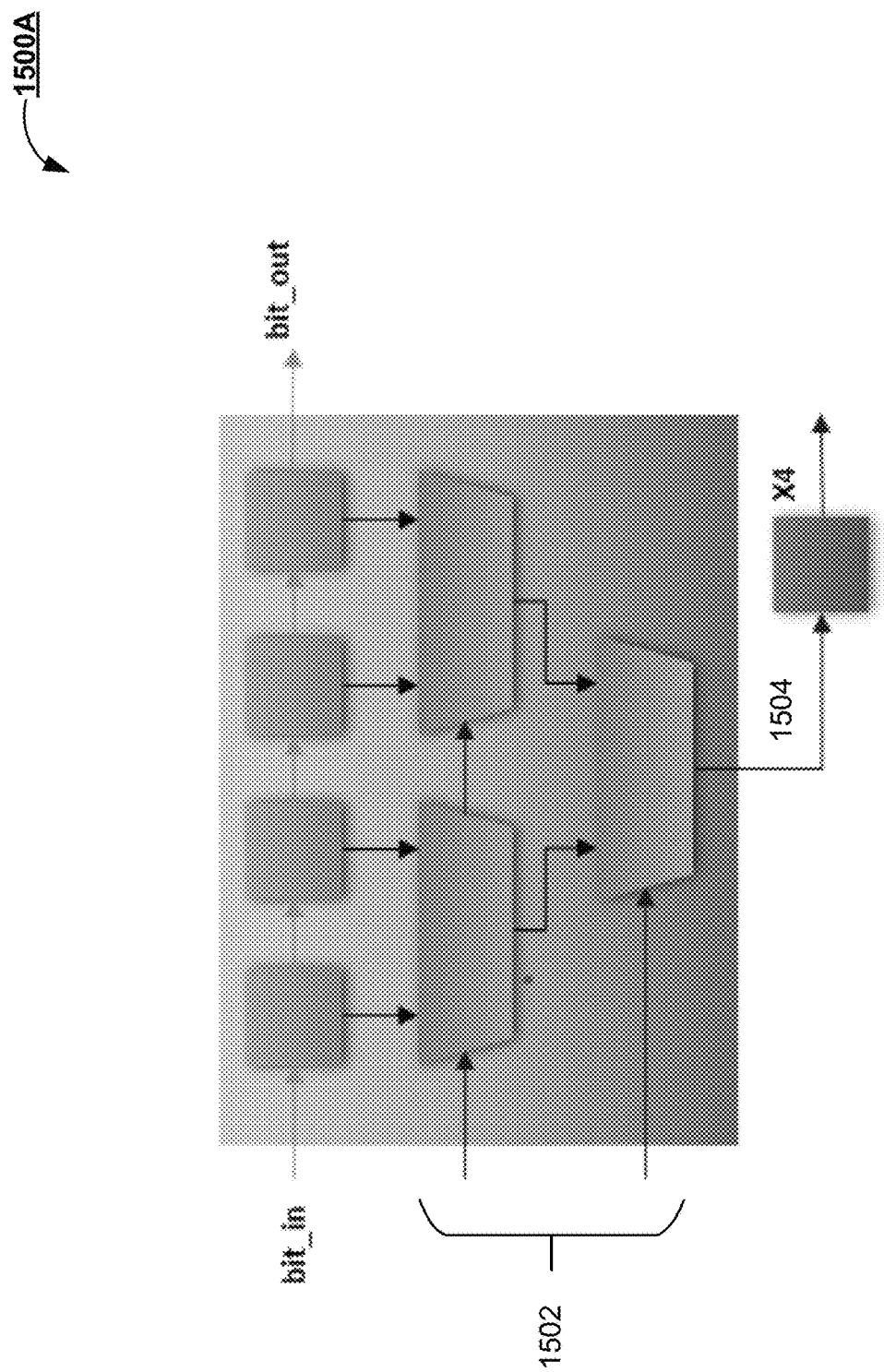
FIG. 15A illustrates an exemplary design including a two-input LUT.
Figure 15B:
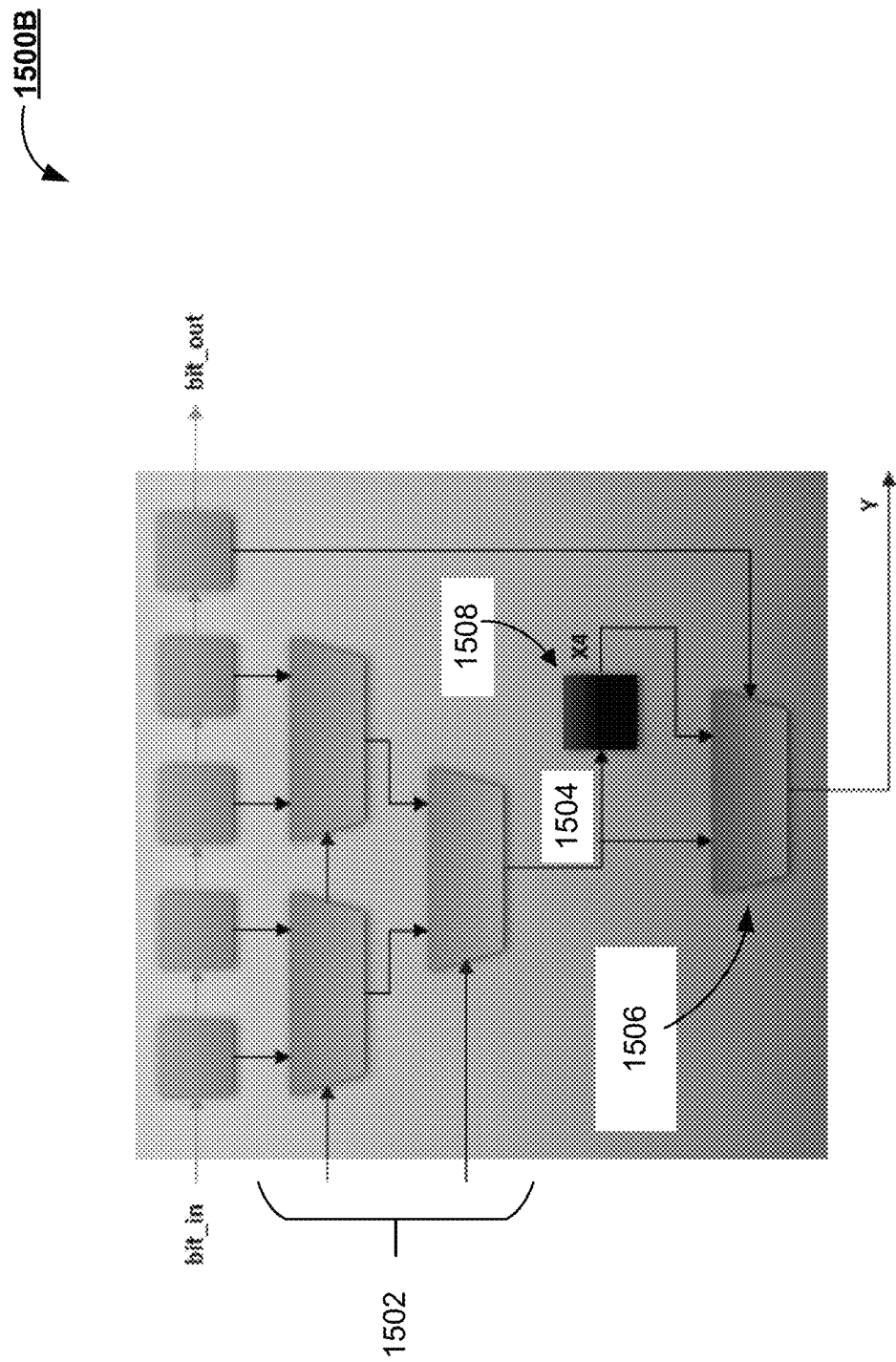
FIG. 15B illustrates a programmable FF implementation of FIG. 15A in accordance with some embodiments discussed herein

According to another embodiment, design FFs may be implemented using programmable components that have sequential elements, similar to FPGA. FIG. 15A presents an exemplary design 1500A including a two-input configurable LUT 1502 comprising an original design FF 1504 at the output. The design FF 1504 at the output of the configurable LUT can be coupled to a FPGA-like configurable block via input into another configurable LUT. FIG. 15B presents such FPGA-like configuration block 1506 used in redacted design 1500B to realize a programmable FF according to some embodiments of the present disclosure. To increase security, additional dummy FF 1508 can also be introduced in the redacted design 1500B. Such modifications may increase the state-space of the design visible to an attacker.

Optimizing Transformations

For very large designs with millions of gates, full redaction of the combination logic may lead to a very long bitstream pattern. In such designs, it may be necessary to limit the configuration bitstream size for the ease of configuring the design and reduce the overhead from the configuration architecture. Moreover, long bitstreams can affect the testability of the designs, which is necessary for transformed designs to ensure that the true functionality is maintained during real-life operations.

Figure 16A:
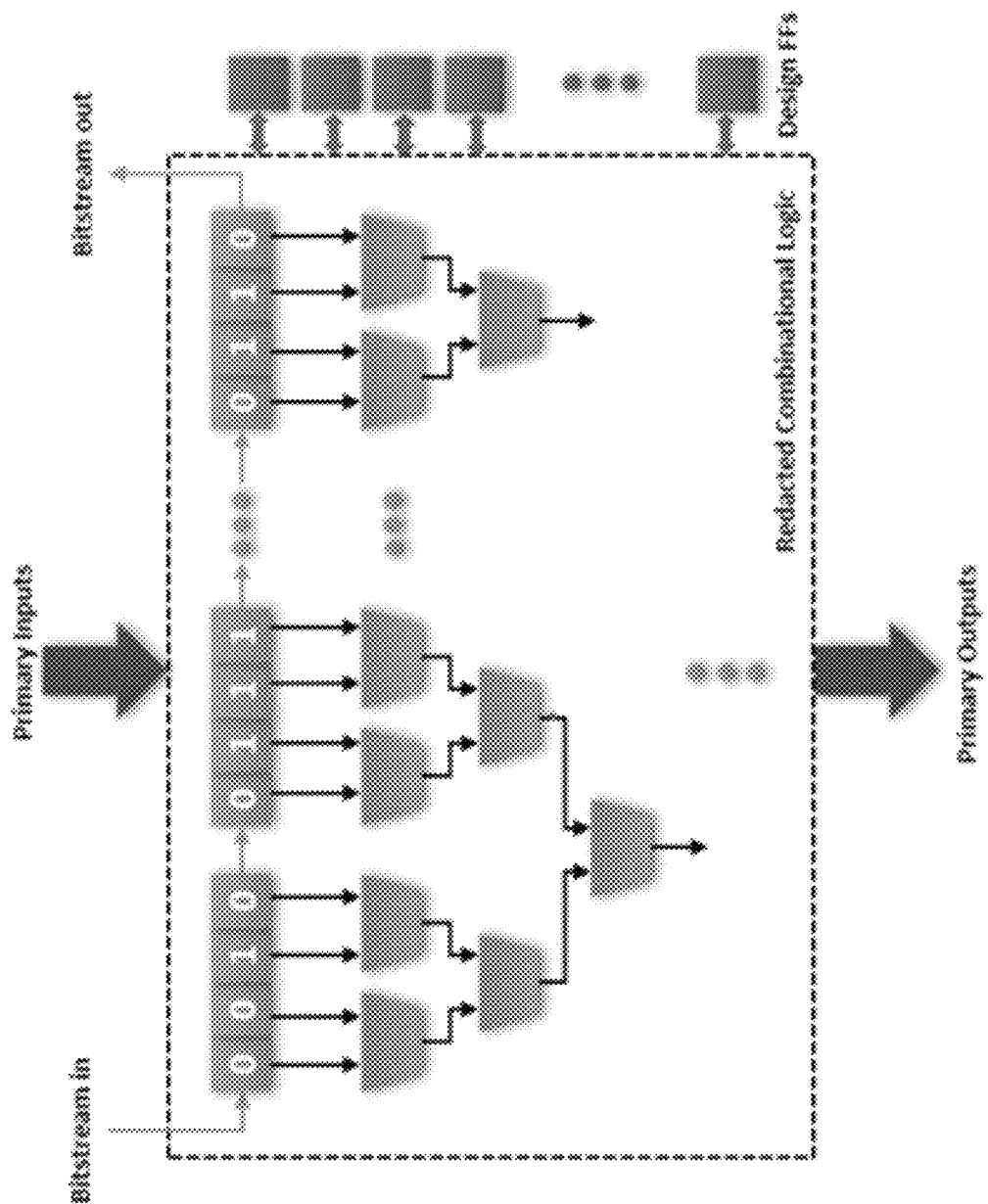
FIGS. 16A and 16B illustrate an implementation of bitstream compaction in accordance with some embodiments discussed herein.
Figure 16B:
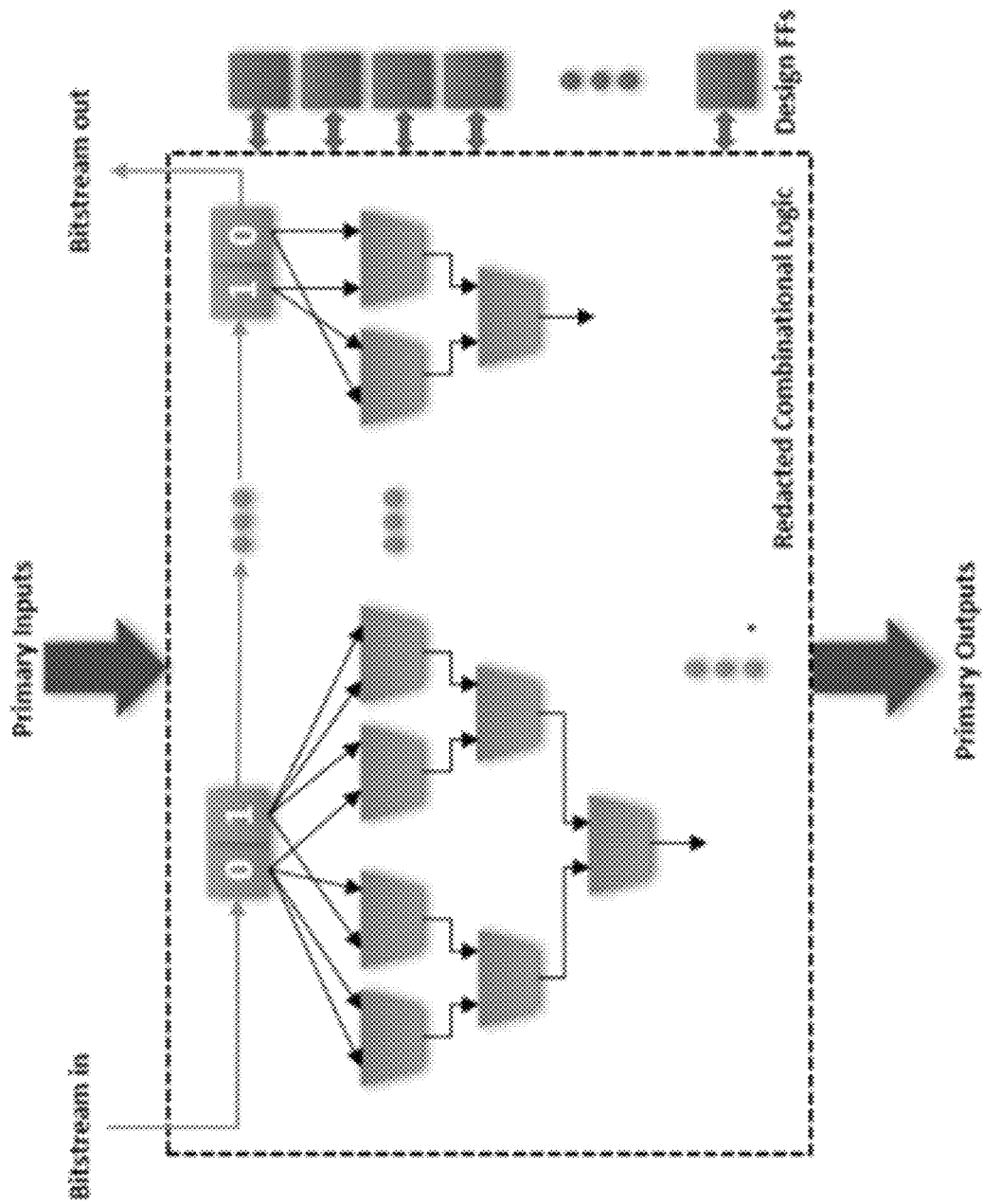

FIGS. 16A and 16B present bitstream compaction according to some embodiments of the present disclosure.

Figure 17A:
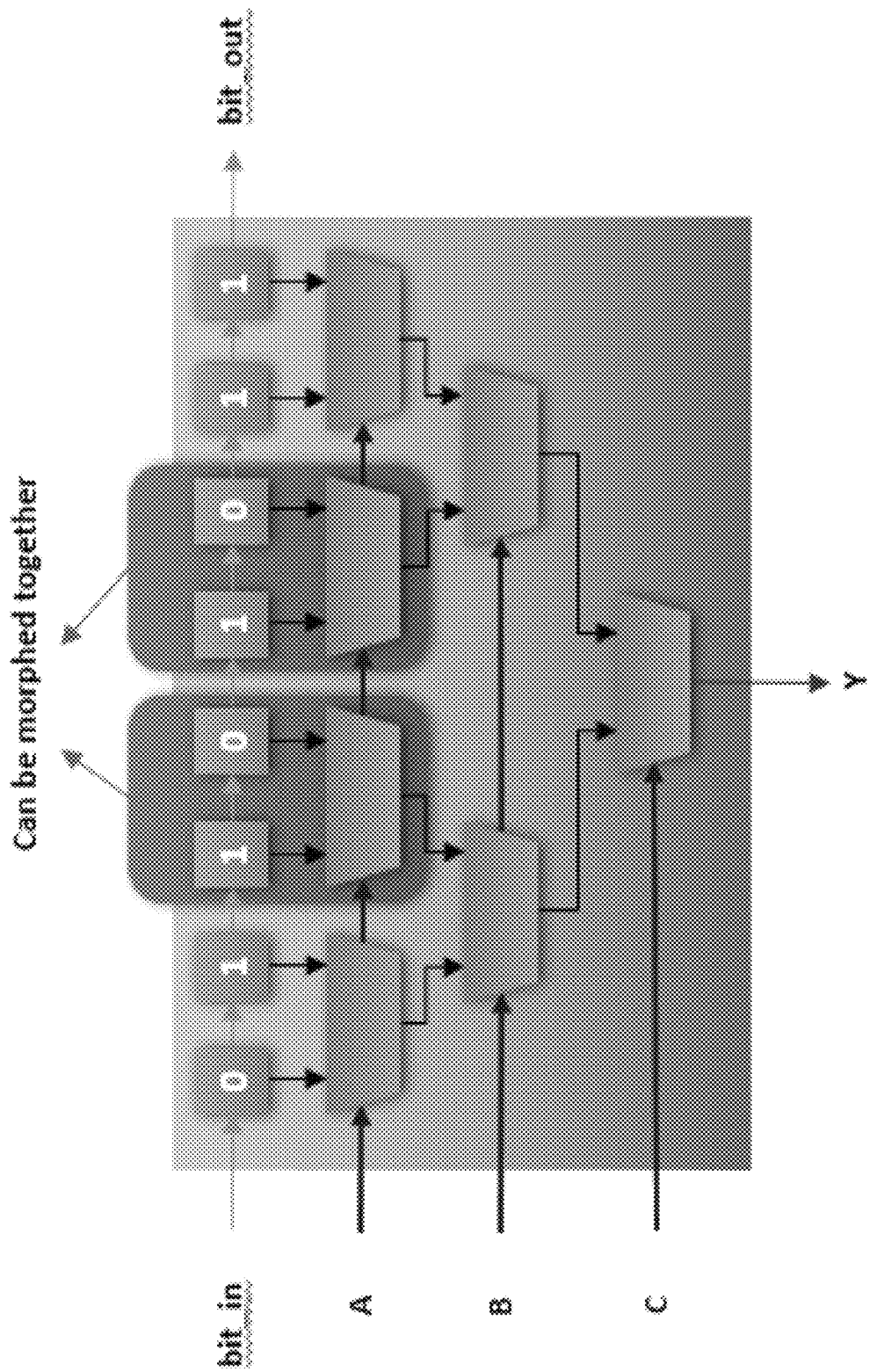
FIGS. 17A and 17B illustrate an implementation of LUT compaction in accordance with some embodiments discussed herein.
Figure 17B:
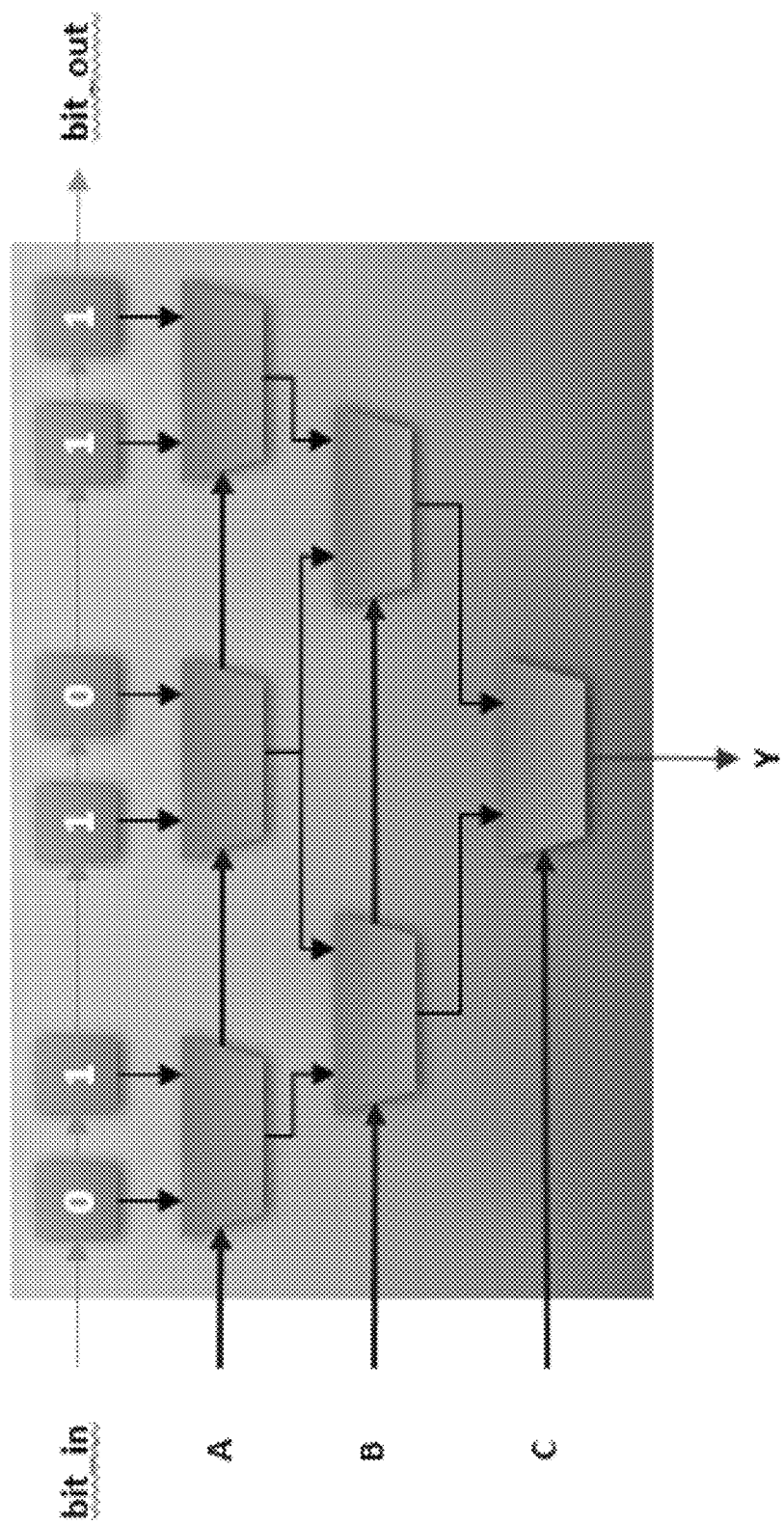

The LUTs used according to various embodiments of the present disclosure may contain duplicate programming bits within the configurable LUTs. According to some embodiments, this redundancy can be exploited via LUT compaction, where redundant bits are removed along with the connected MUXes. FIGS. 17A and 17B are presented to depict an implementation of LUT compaction. As depicted, LUTs having duplicative bit pattern "10" may be morphed together into a single LUT. Duplicative LUT compaction may also be implemented along with bitstream compaction at a global level to optimize the configuration bitstream size for extremely large designs.

Figure 11:
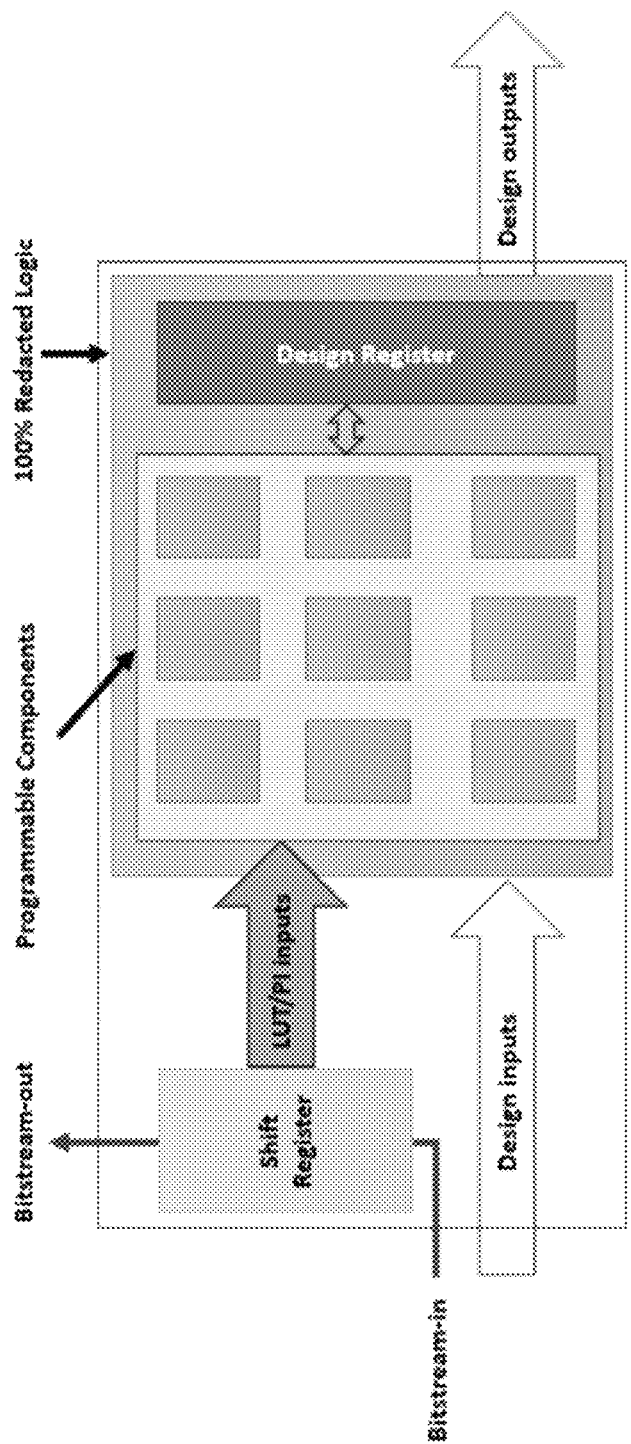
FIG. 11 illustrates a bitstream configuration architecture in accordance with some embodiments discussed herein.
Figure 18:
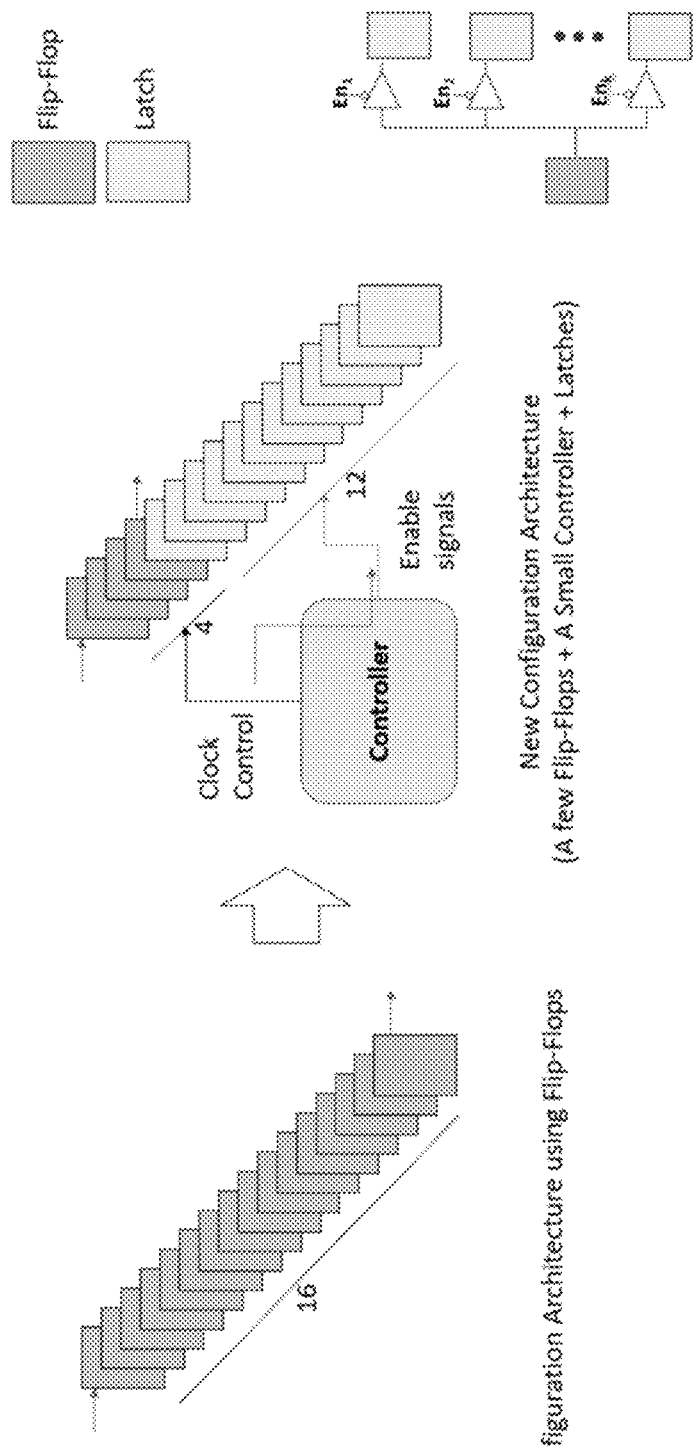
FIG. 18 illustrates latch-based configuration architecture in accordance with some embodiments discussed herein.
Figure 19:
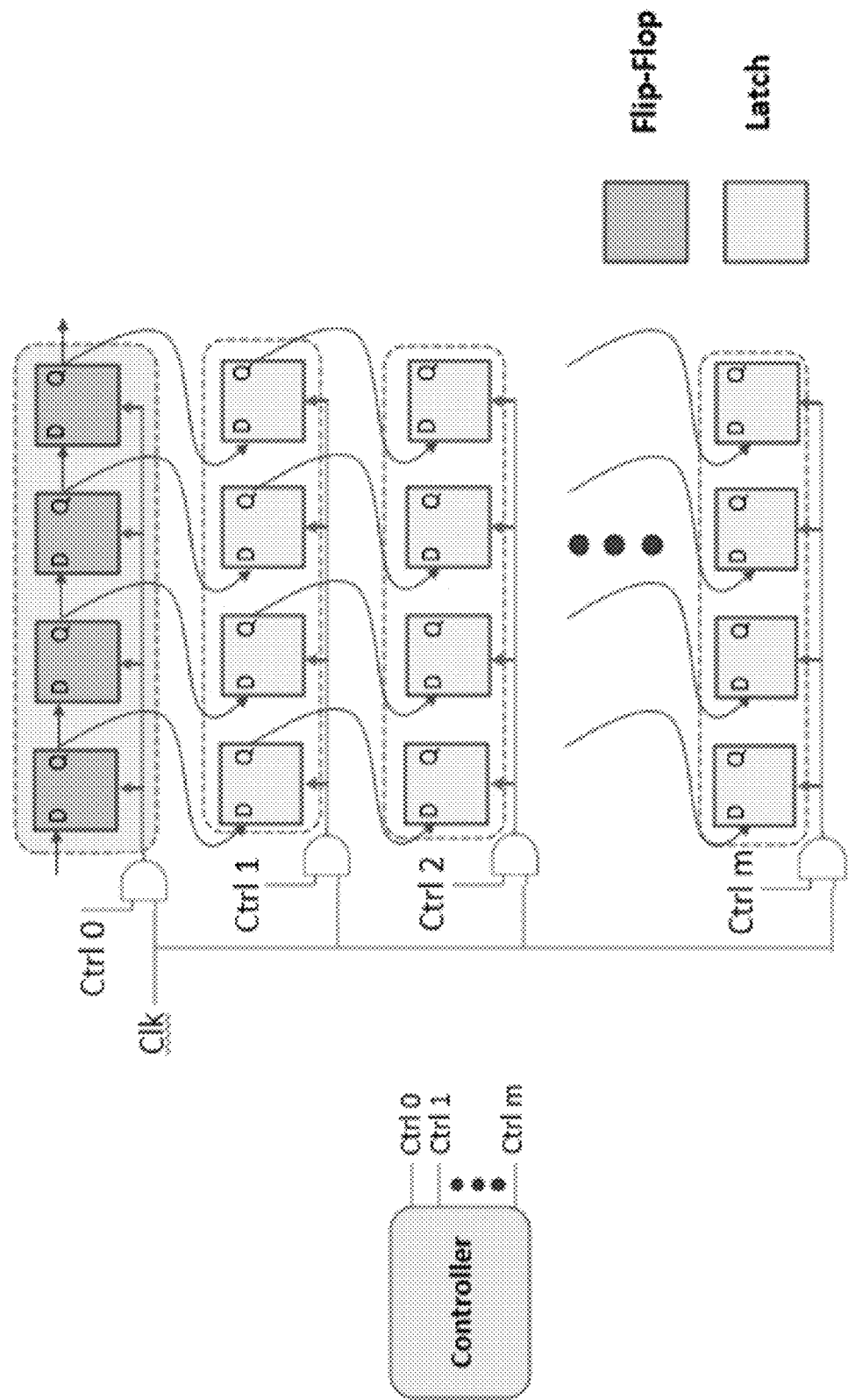
FIG. 19 illustrates a shift register implementation of a latch-based configuration architecture in accordance with some embodiments discussed herein.
Figure 20:
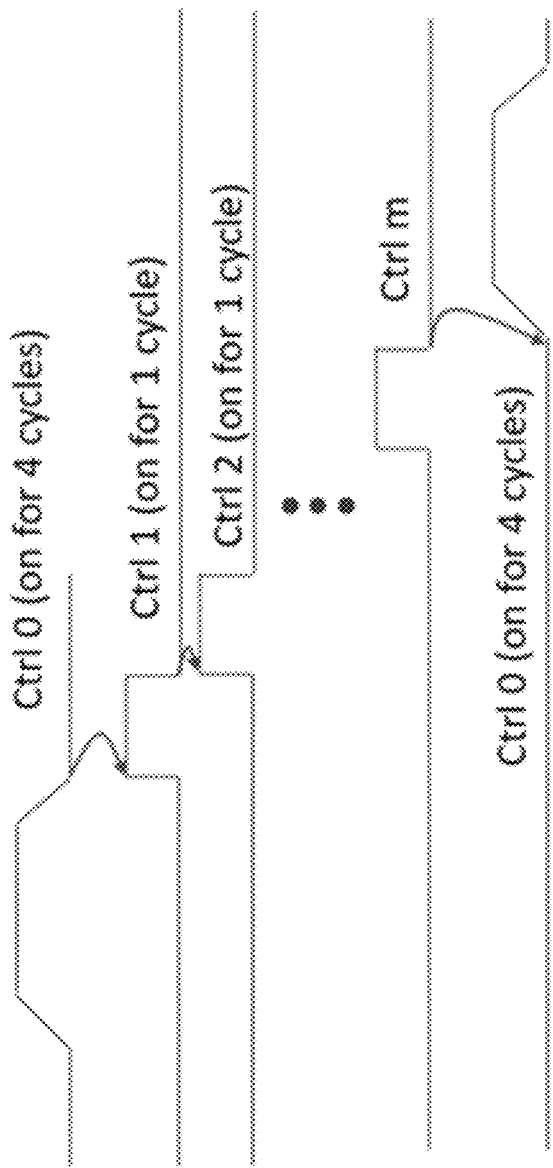
FIG. 20 illustrates a timing diagram of a latch-based configuration architecture in accordance with some embodiments discussed herein.

The bitstream configuration architecture depicted in FIG. 11 may comprise a long daisy-chained shift register that is loaded with a configuration bitstream. For a large design, the configuration architecture contributes to significant overheads, even after bitstream compaction and LUT compaction. According to some embodiments, to reduce the overheads, a latch-based configuration architecture may be used, where part of the shift-register is implemented using latches and a small FSM-based controller to generate the enable signals for the latches as shown in FIGS. 18, 19, and 20.

Figure 21:
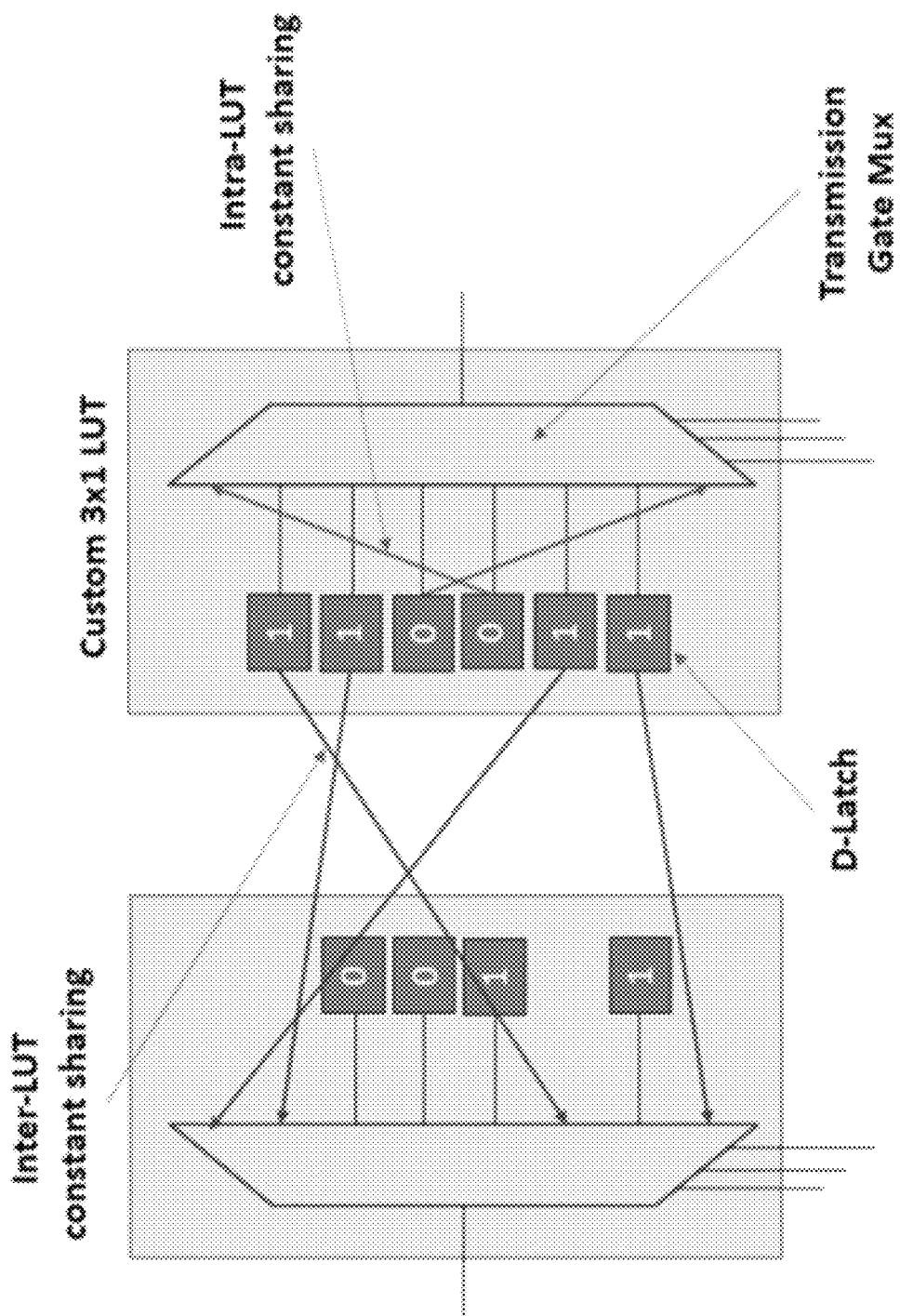
FIG. 21 illustrates sharing of a constant between different LUTs in accordance with some embodiments discussed herein.
Figure 22:
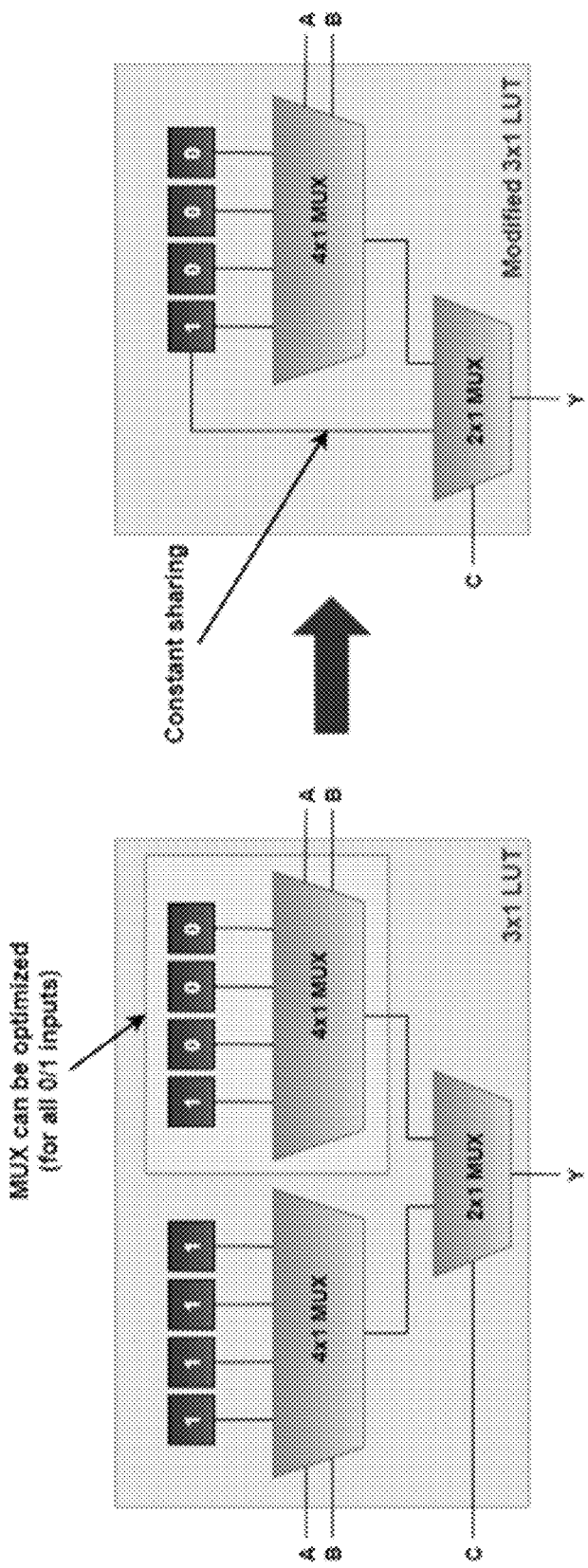
FIG. 22 illustrates the reduction in area due to constant sharing between different LUTs in accordance with some embodiments discussed herein.

The configuration bitstream for the configurable LUTs includes an array of constant bits (0 or 1). According to some embodiments, the bits of the configuration bitstream are shared between the MUXes in a configurable LUT (intra-LUT sharing) or in between configurable LUTs (inter-LUT sharing), as illustrated in FIG. 21. Constant sharing (both intra-LUT and inter-LUT) may result in a significant reduction in chip area as the transformed designs with configurable LUTs are optimized. For a modified 3×1 LUT, the reduction in area due to constant sharing is shown in FIG. 22. As depicted in FIG. 22, this reduction in chip area comes at the cost of security, as the size of configuration bitstream decreases (halved in this case) due to constant sharing. The trade-off between area overhead and the security goal may dictate how constant sharing is implemented during design transformation.

Figure 23:
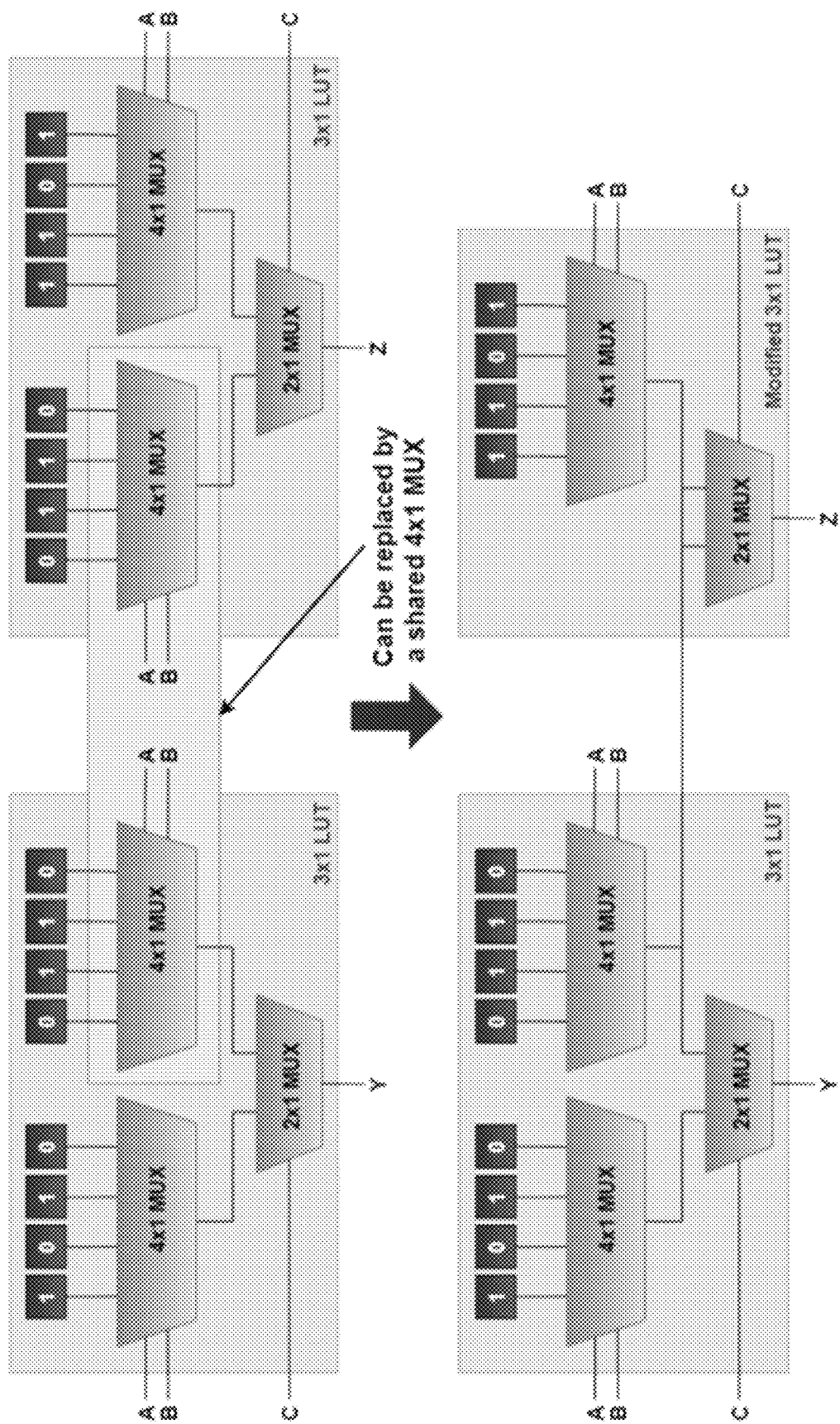
FIG. 23 illustrates a LUT before and after sharing of a multiplexer in accordance with some embodiments discussed herein.

In some embodiments, MUX sharing may be implemented between configurable LUTs having MUXes with identical inputs and configuration bitstream. Such MUXes can be replaced with a single MUX that is shared between the configurable LUTs. The shift registers used to store the bits of the configuration bitstream for the configurable LUTs may also be shortened, as the shared MUX needs to be configured only once. The area reduction for two 3×1 configurable LUTs is illustrated in FIG. 23. MUX sharing may also lead to a decrease in bitstream size, and as in the case of constant sharing, as discussed above, the trade-off between security and area overhead may limit the degree of MUX-sharing during programmable replacement of logic blocks.

Figure 24:
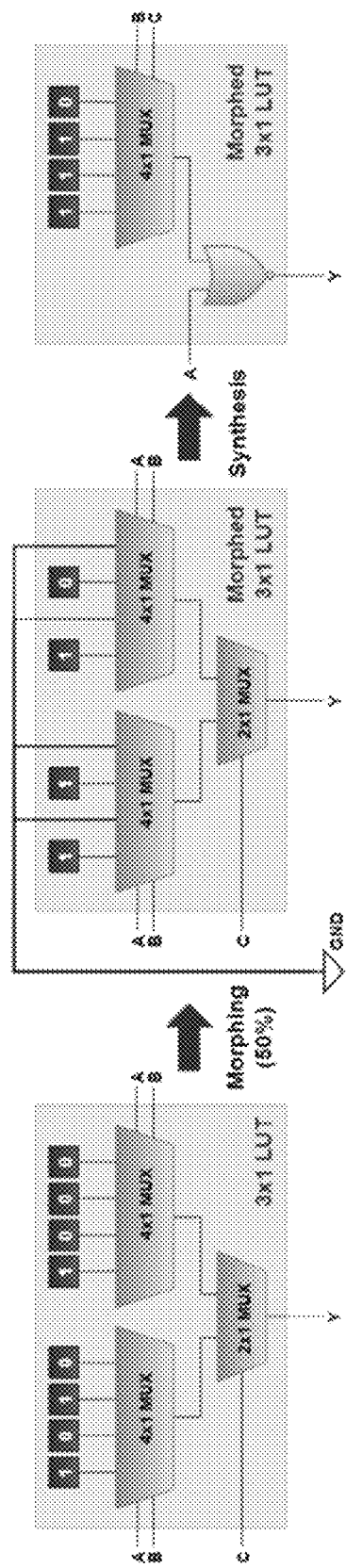
FIG. 24 illustrates a LUT before and after morphing in accordance with some embodiments discussed herein.

In some embodiments, configurable LUTs may be morphed by connecting some of the MUX inputs directly to VDD (Logic 1) and GND (Logic 0). The remaining MUX inputs may be configured using latches or other memory elements. Morphing can take advantage of constant propagation during synthesis, where synthesis tools try to minimize the hardware utilization by optimizing logic driven by Logic 1 or Logic 0. FIG. 24 illustrates the impact of morphing a 3×1 configurable LUT. Morphing can be used during transformation to achieve a low area overhead target, while still removing security critical logic cones from the original design.

The configuration bitstream should be correctly applied to enable the original functionality of the design. In some embodiments, to apply the configuration bitstream efficiently with minimum overheads, a constant array can be implemented in two modes, either using a chain of shift registers, or using a 2D SRAM.

Figure 25:
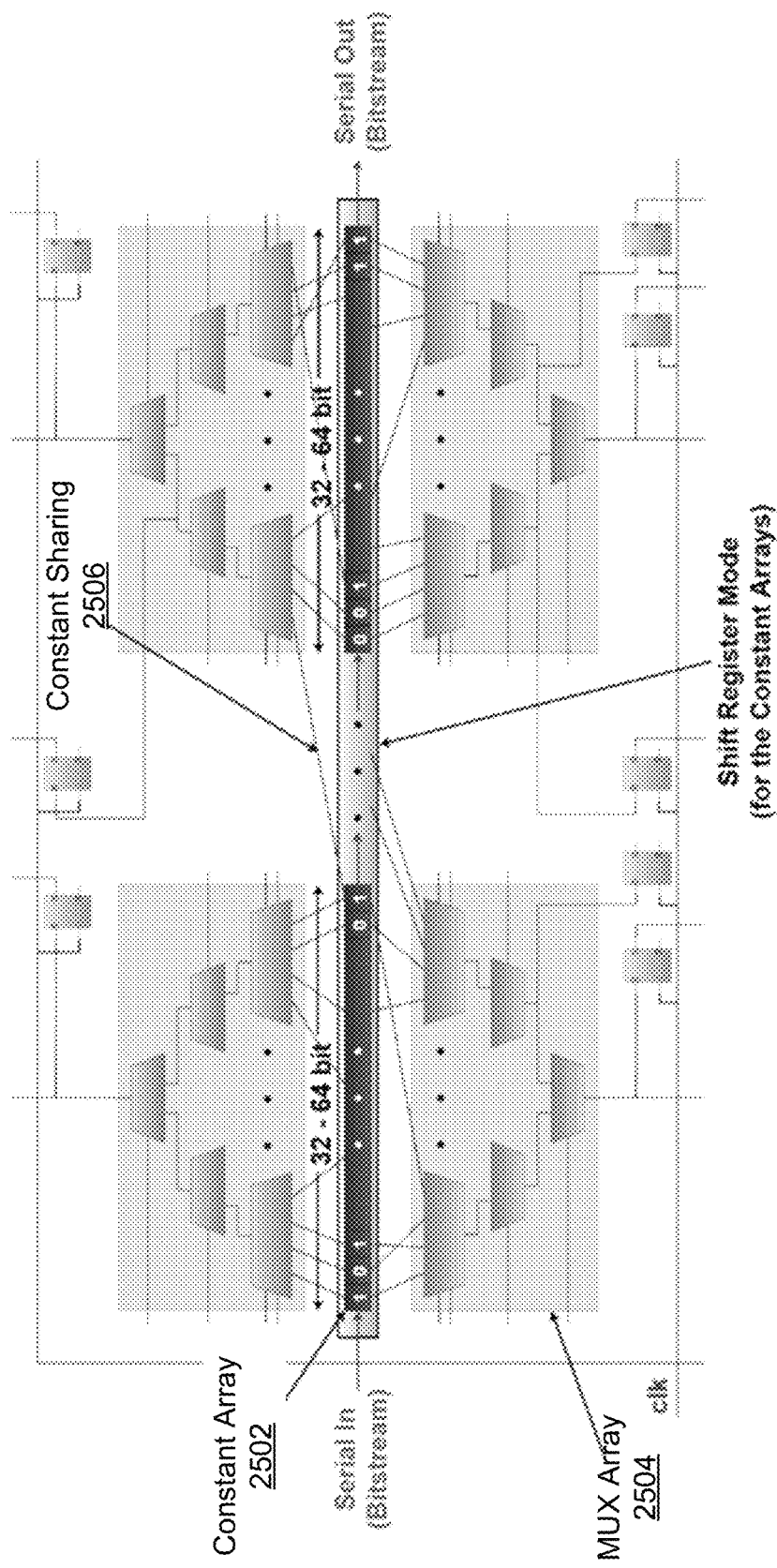
FIG. 25 illustrates a configuration bitstream being applied using the shift register mode of constant arrays in accordance with some embodiments discussed herein.

The constant arrays can be realized as shift registers of varying sizes (16-bit, 32-bit, 64-bit, etc.) that include latches with enable signals, where the shift register is loaded serially. MUX arrays 2504 of configurable LUTs, as well as the other added programmable components may be connected to latches of a constant array 2502 on both sides, as shown in FIG. 25. Enable signals for the latches may be generated by a scan-chain based configuration architecture. Constant sharing 2506 is implemented with constant array 2502 to limit the length of the configuration bitstream and reduce the number of latches in the shift register, which reduces the overhead even further.

Figure 26:
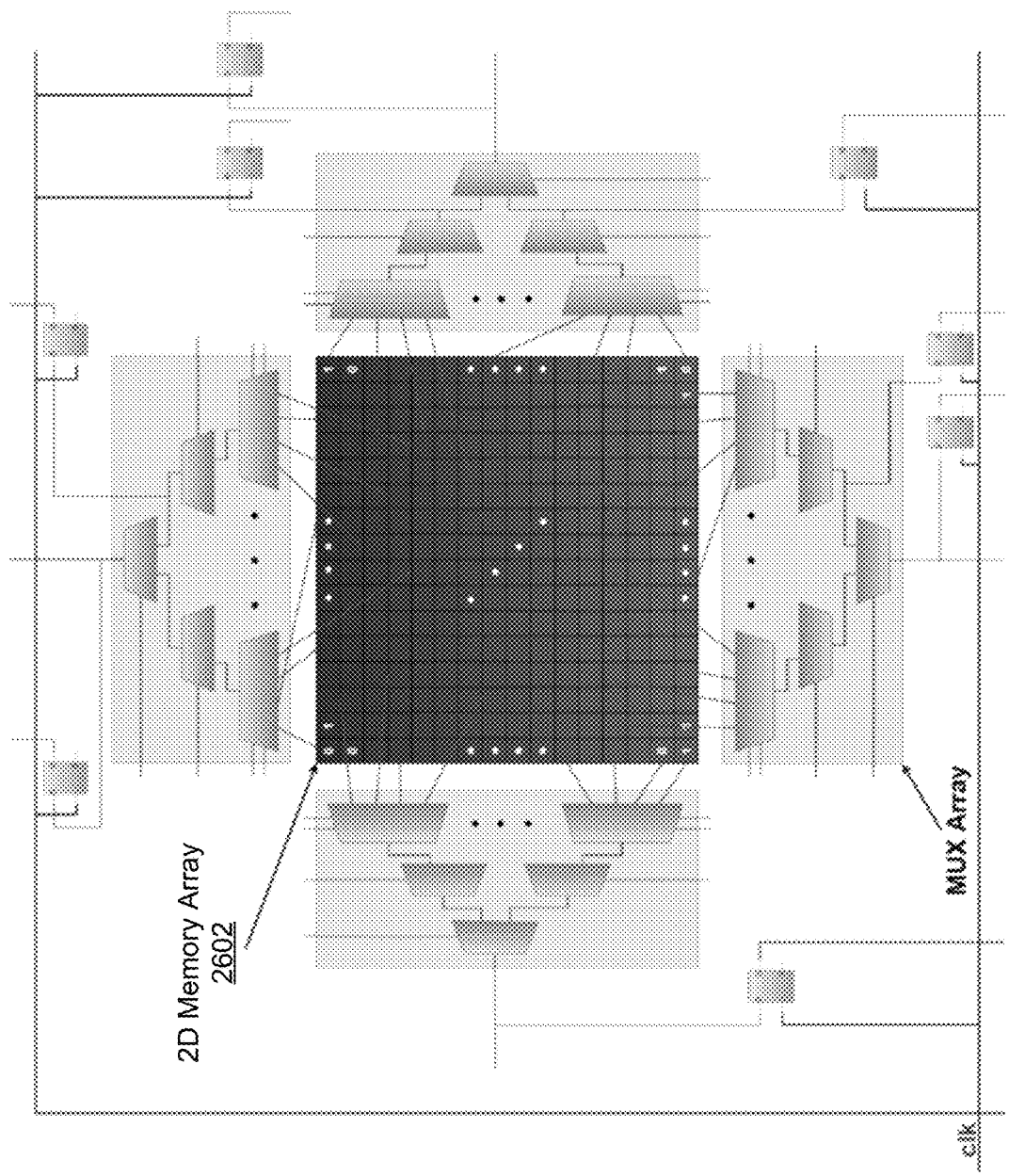
FIG. 26 illustrates a configuration bitstream being applied using a 2D SRAM-mode of constant arrays in accordance with some embodiments discussed herein.

The configuration bitstream for the programmable component can be read out at bit level from all four sides of a SRAM array as illustrated in FIG. 26, according to some embodiments of the present disclosure. To store the constant bits more efficiently, constant arrays can be implemented using a 2D memory array 2602.

Figure 27:
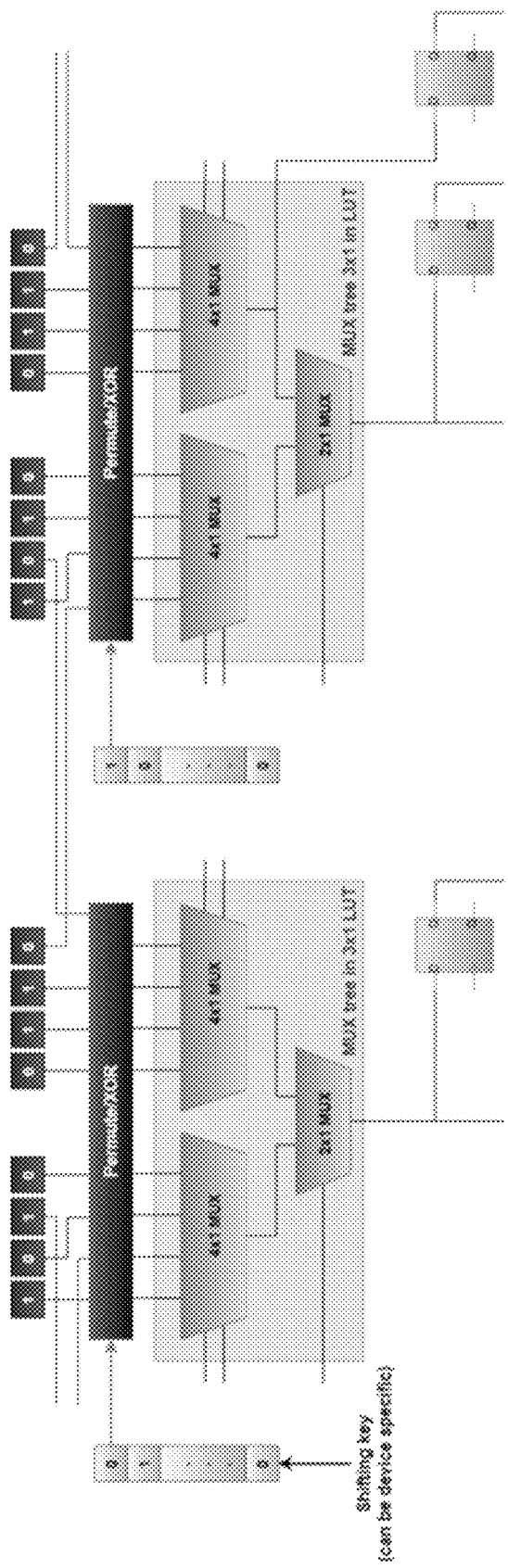
FIG. 27 illustrates a constant transformation array used to generate a device-specific bitstream in accordance with some embodiments discussed herein.

In some embodiments, transformation logic in the form of permutation or XORing blocks are inserted between the constant array storing the configuration bitstream and the programmable components to create a constant transformation array (CoTA). A random and device-specific shifting key may be used to program each transformation block, thus causing transformations to be randomized independent of the configuration bitstream. Randomness can also be imparted into the removal cost function, which is combined with the random shifting of keys to make the configuration bitstream device specific. FIG. 27 presents an exemplary implementation of CoTA according to some embodiments of the present disclosure.

Figure 28:
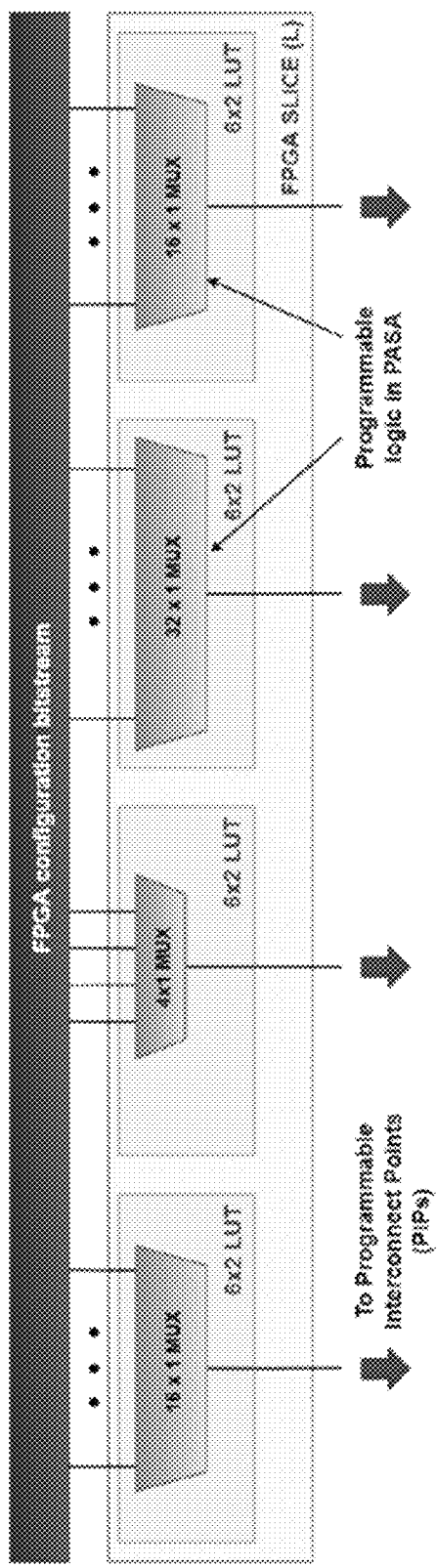
FIG. 28 illustrates a design transformation in accordance with some embodiments discussed herein.

Embodiments of the present disclosure can be applied to any conventional FPGA to realize application specific programmable replacement of security critical logic cones using programmable components. Modern FPGAs may include thousands of CLBs, where each CLB contains multiple slices comprised of configurable LUTs, carry chains, MUXes and D flip-flops. Some slices also include additional memory elements like RAM and shift-registers. The multiplexing logic for the programmable LUTs in embodiments of the present disclosure can be mapped to FPGA LUTs in the slices and the constant array containing the bits of the configuration bitstream can be executed using the storage elements in the slices. Alternatively, the LUTs can also be configured using the bitstream configuration file used by the FPGA. The added programmable component is connected to the switch matrices in the FPGA containing programmable component points (PIPs). FIG. 28 depicts an exemplary implementation using a FPGA according to some embodiments of the present disclosure.

Moreover, embodiments of the present disclosure can be implemented using custom FPGAs to optimize resource utilization during transformation. Specialized FPGA architectures can be developed with provisions to implement custom M×N MUXes and the corresponding shift registers to store the configuration bitstream. Designing custom FPGAs can provide more room for design transformation. The threat model for FPGAs is significantly different from ASIC, and FPGA application of PASA protects hardware IPs against field-based confidentiality and integrity attacks.

Structural attacks like graph or network matching attacks that take advantage of known circuit graphs or networks and apriori knowledge about structural correlation in the design, as well as integrity attacks on a hardware IP can be made intractable by randomizing the structural transformation. Embodiments of the present disclosure provide techniques that address structural attacks.

Figure 29:
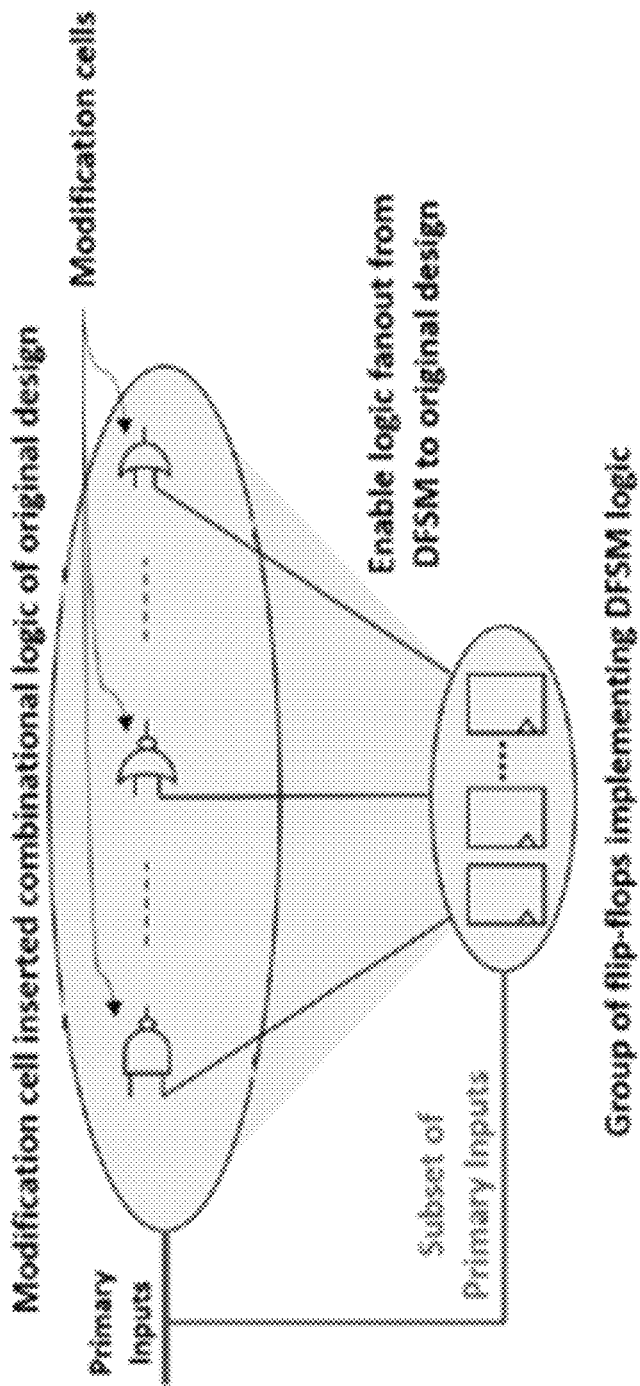
FIG. 29 illustrates a transformation involving the fanout of a multitude of flip-flops implementing dummy finite-state machines (FSMs) in accordance with some embodiments discussed herein.

In some embodiments, the input design may be structurally transformed before removal and programmable component replacement. The pre-removal transformation can be obtained through logic locking or obfuscation of the original design. Logic locking and obfuscation techniques may include built-in measures which randomize the structural transformation to prevent structural attacks. An example of pre-removal transformation that can be integrated with embodiments of the present disclosure is HARPOON, a state-space obfuscation technique with low-hardware cost, which introduces dummy FSMs (DFSMs) into the design, as illustrated in FIG. 29.

In some embodiments, structural decorrelation can also be incorporated into embodiments of the present disclosure by varying design constraints used during the final synthesis stage in the workflow. A standard synthesis tool may provide a number of optimization constraints which can be easily modified to control the synthesis process. Such configurable constraints may be leveraged during synthesis to insert more randomness during transformation. For example, performing constrained synthesis with high area effort versus high power effort will produce different versions of the transformed design that is optimized for area and power respectively.

In some embodiments, the hypergraph generated from the original design may provide another option for structural decorrelation. In particular, the hypergraph can be partitioned into a set of smaller and roughly equal graphs using a partitioning tool. Based on the size of the input design, the same hypergraph can be partitioned randomly in a large number of ways, and in each case, the transformed design will be structurally unique.

In some embodiments, the outputs of randomly chosen configurable LUTs and/or programmable components may be inverted to increase structural randomness. Inverting the output of any configurable LUT and/or programmable component can alter its configuration bitstream. For example, if a 2-input AND gate is replaced by a configurable LUT 2×1, the configuration bitstream for the configurable LUT changes from 4'b0001 to 4'b1110 if output of the configurable LUT is inverted. Structural decorrelation can also be significantly increased by randomly choosing programmable components for output inversion.

In some embodiments, the size of a logic cone to be replaced may be varied. The size of the logic cone selected for replacement determines the size (the value of M and N) of a configurable LUT.

In some embodiments, the configurable LUTs inserted for programmable replacement can be incrementally decomposed into smaller configurable LUTs for structural decorrelation, for a given logic cone. LUT decomposition also allows delocalization of the configuration constants of larger configurable LUTs, further increasing the randomness.

Example Experimental Implementation of Various Embodiments

The implementation results for multiple designs from MIT CEP benchmark suite are provided—total 10 open-source benchmarks where 10%, and 50% targeted removal (and replacement with LUT network) of logic cone were performed. The area overhead values for the 250 nm LEDA standard cell library are presented in Table I.

TABLE I

Area overheads obtained for various MIT-CEP benchmarks.

| Benchmarks | # cells before transformation | 10% redacted | 50% redacted |
| --- | --- | --- | --- |
| DES3 | 1896 | 25.86% | 89.03% |
| FIR | 2514 | 21.91% | 109.28% |
| IIR | 3784 | 22.31% | 114.64% |
| MD5 | 3551 | 35.24% | 114.78% |
| SHA256 | 6491 | 24.57% | 140.66% |
| DFT | 122189 | 23.02% | 115.99% |
| IDFT | 121094 | 23.17% | 112.02% |
| AES192 | 154893 | 21.73% | 95.63% |
| GPS | 158030 | 23.01% | 99.25% |
| RSA | 205798 | 27.06% | 118.19% |
| Average | 78024 | 24.79% | 110.95% |

CONCLUSION

It should be understood that the examples and embodiments described herein are for illustrative purposes only and that various modifications or changes in light thereof will be suggested to persons skilled in the art and are to be included within the spirit and purview of this application.

Many modifications and other embodiments of the present disclosure set forth herein will come to mind to one skilled in the art to which the present disclosures pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claim concepts. Although specific terms are employed herein, they are used in a generic and descriptive sense only and not for purposes of limitation.

What is claimed is:

1. A method of protecting an integrated circuit design against confidentiality and integrity attacks, the method comprising:

receiving, by a computing device, a file including data comprising a hardware netlist;

converting, by the computing device, the data into a hypergraph, wherein the hypergraph comprises (i) a plurality of nodes representative of a plurality of logic gates and (ii) one or more edges representative of one or more connections of the plurality of logic gates;

replacing, by the computing device, a node from the plurality of nodes in the hypergraph with a configurable lookup table (LUT);

inserting, by the computing device, a first programmable component into the hypergraph based on the configurable LUT, wherein the first programmable component comprises a programmable interconnect that is inserted at an output of the configurable LUT; and generating, by the computing device, a redacted design output file based on the hypergraph including the configurable LUT and the first programmable component.

2. The method of claim 1 wherein the hypergraph comprises a directed acyclic graph comprising one or more of an AND gate, an OR gate, or an inverter gate.

3. The method of claim 1 further comprising identifying a security critical node from the plurality of nodes based on a cost of removal corresponding to the security critical node.

4. The method of claim 3 further comprising calculating, for the plurality of nodes in the hypergraph, a cost function using stochastic properties comprising Shannon entropy E, fan-in cone FI, or fan-out cone FO.

5. The method of claim 3 further comprising:
determining, for the security critical node, a maximum fan-out free cone (MFFC);
obtaining a local optimal cut by analyzing the MFFC based on area and delay; and
selecting a globally optimal cut from the local optimal cut based on normalized area and delay cost of the local optimal cut based on a pre-defined security target.

6. The method of claim 5 further comprising:
mapping the globally optimal cut to the configurable LUT according to size; and
chaining the configurable LUT based on order of a proximity metric that is calculated from a relative distance of the plurality of logic gates corresponding to the node.

7. The method of claim 1 further comprising connecting a second programmable component to an input of the programmable interconnect at a same logic depth as the configurable LUT.

8. The method of claim 7 wherein the second programmable component comprises at least one of a programmable flip-flop (FF) or a programmable clock gating.

9. The method of claim 1 wherein the programmable interconnect comprises a XOR gate or a XNOR gate and one or more multiplexers (MUXes).

10. The method of claim 1 further comprising:
identifying, from the hypergraph, one or more logic cones that store critical information; and
mapping the one or more logic cones to a M×N configurable LUT using Shannon Decomposition Theorem or Boole's Expansion Theorem.

11. The method of claim 1 further comprising:
generating a configuration bitstream for the configurable LUT by simulating logic corresponding to the node.

12. The method of claim 11 wherein the configurable LUT is programmed using the configuration bitstream.

13. The method of claim 11 wherein the configuration bitstream is stored in one or more shift registers of varying sizes.

14. The method of claim 13 wherein a shift register of the one or more shift registers comprises a plurality of latches, wherein a latch from the plurality of latches comprises an enable pin.

15. The method of claim 11 further comprising loading the configuration bitstream to a daisy-chained shift register, wherein (i) the daisy-chained shift register comprises a latch-based configuration, (ii) the latch-based configuration comprises a plurality of latches and a finite-state machine-based controller, and (iii) the finite-state machine-based controller is configured to generate enable signals for the plurality of latches.

16. The method of claim 11 wherein one or more bits of the configuration bitstream are shared between a plurality MUXes within the configurable LUT or in between the configurable LUT.

17. The method of claim 1 further comprising replacing one or more nodes in the hypergraph corresponding to one or more flip-flops in a shift register with one or more scan-based FFs.

18. The method of claim 17 wherein the one or more scan-based FFs are controllable via a scan enable signal to select between a configuration bit functionality or a design FF functionality.

19. The method of claim 17 further comprising:
connecting the one or more scan-based FFs to one or more inputs of a MUX in a MUX array; and
coupling an output of the configurable LUT to a field-programmable gate array-like block.

* * * * *